(12) United States Patent
Hamamoto

(10) Patent No.: US 6,209,105 B1
(45) Date of Patent: *Mar. 27, 2001

(54) BATTERY-DRIVEN ELECTRONIC EQUIPMENT SYSTEM AND POWER SOURCE CONTROL METHOD THEREFOR

(75) Inventor: Akihiko Hamamoto, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 14 days.

(21) Appl. No.: 08/902,335

(22) Filed: Jul. 29, 1997

(30) Foreign Application Priority Data

Sep. 10, 1996 (JP) .................................. 8-260201

(51) Int. Cl.$^7$ ...................................................... G06F 1/32
(52) U.S. Cl. ........................................... 713/300; 710/101
(58) Field of Search .............................. 712/301; 713/300, 713/310, 320, 340; 710/101

(56) References Cited

U.S. PATENT DOCUMENTS

| | | | |
|---|---|---|---|
| 5,347,425 | * 9/1994 | Herron et al. | 361/683 |
| 5,436,792 | * 7/1995 | Leman et al. | 361/686 |
| 5,475,626 | * 12/1995 | Viletto | 364/708.1 |
| 5,477,415 | * 12/1995 | Mitcham et al. | 361/686 |
| 5,517,434 | * 5/1996 | Hanson et al. | 364/708.1 |
| 5,641,588 | * 6/1997 | Sieminski et al. | 428/98 |
| 5,713,006 | * 1/1998 | Shigeeda | 395/497.01 |
| 5,790,375 | * 8/1998 | Lee | 361/686 |
| 5,860,015 | * 1/1999 | Olson | 395/750.01 |
| 5,864,294 | * 1/1999 | Hsu et al. | 340/635 |

\* cited by examiner

Primary Examiner—David A Wiley
(74) Attorney, Agent, or Firm—Fitzpatrick, Cella, Harper & Scinto

(57) ABSTRACT

There is disclosed an electronic equipment system consisting of an electronic equipment and an expander detachably attached thereto and provided with a power source circuit and a power source control circuit in each of the electronic equipment and the expander, the system comprising attachment detecting means for detecting that the expander is attached to electronic equipment, power supply control means for controlling permission or inhibition of power supply to the power source circuit of the other side, other power source control circuit activating means for activating the power source control circuit of the other side by initiating the power supply from the power source circuit of the other side to the power source control circuit of the other side, and informing means for informing the operation status of the power source control circuit of the self side to the power source control circuit of the other side, wherein, in case the attachment detecting means detects the attachment of the expander to the electronic equipment, the power source control circuit of the self side permits the power supply by the power supply control means to the power source circuit of the other side, also causes the other power source control circuit activating means to initiate the power supply from the power source circuit of the other side to the power source control circuit of the other side thereby activating the power source control circuit of the other side, also causes the informing means to inform the operation status of the power source control circuit of the self side to the power source control circuit of the other side, thereby effecting power supply processes synchronized between the both power source control circuits.

16 Claims, 20 Drawing Sheets

BATTERY-DRIVEN ELECTRONIC EQUIPMENT SYSTEM AND POWER SOURCE CONTROL METHOD THEREFOR

BACKGROUND OF THE INVENTION

1. Field of the Invention

The present invention relates to an electronic equipment system with detachable expander and a power source processing method therefor.

2. Related Background Art

Among such electronic equipment system, there has been proposed a notebook personal computer, wherein it's functions can be expanded by docking an expander incorporating an expansion board.

Such a notebook personal computer with expander is constructed so as to extend the operation time in the portable use, such that it is operable as a dual battery system by extracting the floppy disk drive of the personal computer and inserting a second battery.

In recent notebook personal computers, the portability is considered important not only in the state of the notebook personal computer but also in the state coupled with the expander, so that it is desired to extend the battery-driven time in the state coupled with the expander.

For achieving such extension of the battery-driven time, it is conceivable to employ the second battery of a large capacity or even to employ a third battery, but, for such purpose, a connection space for the battery has to be secured on the expander.

FIGS. 21A and 21B show the configurations of the power source in the conventional notebook personal computer, wherein FIG. 21A shows a case of power supply to the expander from the power source circuit (DC/DC circuit) of the personal computer, while FIG. 21B shows a case in which power source circuits (DC/DC circuits) are respectively provided in the personal computer and the expander.

In the case shown in FIG. 21A, the docking connector has to be provided with power supply lines of a number allowing the supply of a current of maximum consumption. Also a signal line for controlling the battery of the expander from a power source controlling microcomputer (PMC) has to be secured in the docking connector. Also the docking connector loses the compatibility in case the maximum current consumption increases in the future by the increase of functions of the personal computer or the expander.

On the other hand, in the configuration shown in FIG. 21B, since the expander is provided with a power source circuit similar to that in the personal computer, the power supply lines can be maintained minimum though the cost increases by a certain amount. Also this configuration can flexibly adapt to the increase of the maximum current consumption in the future. The power source controlling microcomputer (PMC) of the personal computer often supports, in addition to the control of the power source system, other functions such as the keyboard control. In the docking, therefore, the power source systems have to be combined so as not to detrimentally affect such other functions. Also the power source modes of both power source controlling microcomputers have to be mutually synchronized in order to extend the battery-driven time in the docking state.

SUMMARY OF THE INVENTION

An object of the present invention is to provide an electronic equipment capable of docking the power source with an expander unit without detrimental effect on other functions, such as keyboard control, supported by the power source control circuit of the electronic equipment, and a power source control method therefor.

Another object of the present invention is to provide an electronic equipment capable of extending the battery-driven time in the docked state by synchronizing the power supply modes of the power source control circuits of the electronic equipment and the expander unit, and a power source control method therefor.

The above-mentioned objects can be attained, according to the present invention, by an electronic equipment system consisting of an electronic equipment and an expander detachably attached thereto and provided with a power source circuit and a power source control circuit in each of the electronic equipment and the expander, the system comprising attachment detecting means for detecting that the expander is attached to the electronic equipment, power source control means for controlling permission or inhibition of power supply to the power source circuit of the other side, other power source control circuit activating means for activating the power source control circuit of the other side by initiating the power supply from the power source circuit of the other side to the above-mentioned power source control circuit of the other side, and informing means for informing the operation status of the power source control circuit of the self side to the power source control circuit of the other side, wherein, in case the attachment detecting means detects the attachment of the expander to the electronic equipment, the power source control circuit of the self side permits the power supply by the above-mentioned power source control means to the power source circuit of the other side, also causing the above-mentioned other power source control circuit activating means to initiate the power supply from the power source circuit of the other side to the power source control circuit of the other side thereby activating the power source control circuit of the other side, and causing the informing means to inform the operation status of the power source control circuit of the self side to the power source control circuit of the other side, thereby effecting power supply processes synchronized between the both power source control circuits.

According to the present invention, there is also provided a power source control method for an electronic equipment system consisting of an electronic equipment and an expander detachably attached thereto and provided with a power source circuit and a power source control circuit in each of the electronic equipment and the expander, wherein, in case the attachment of the expander to the electronic equipment is detected, the power source control circuit of the self side permits the power supply to the power source circuit of the other side, also initiating the power supply from the power source circuit of the other side to the power source control circuit of the other side thereby activating the power source control circuit of the other side, and informing the operation status of the power source control circuit of the self side to the power source control circuit of the other side, thereby effecting power supply processes synchronized between both power source control circuits.

DETAILED DESCRIPTION OF THE PREFERRED EMBODIMENTS

Figure 1:
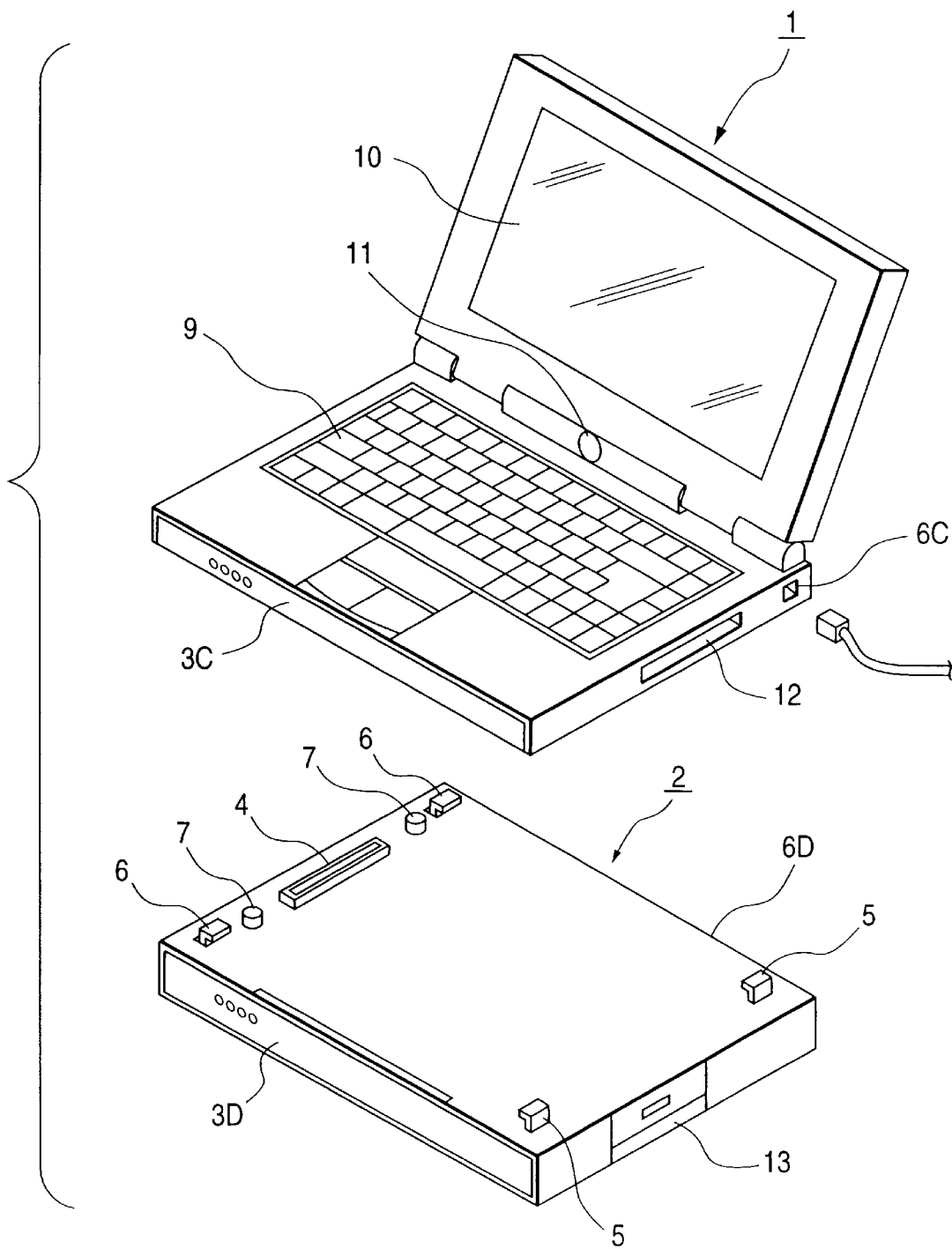
FIGS. 1 and 2 are external perspective views of a notebook personal computer and an expander.
Figure 2:
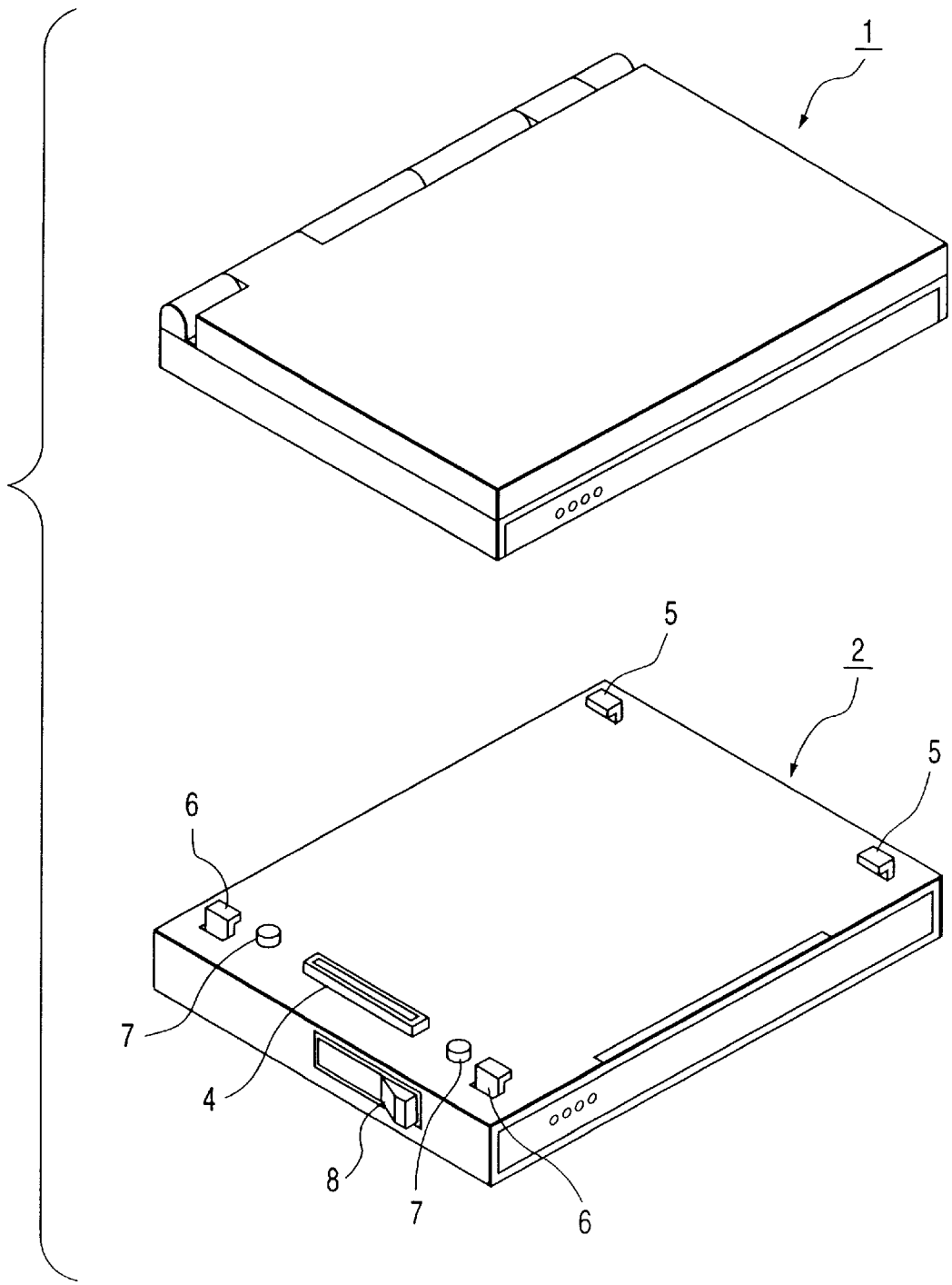
Figure 3:
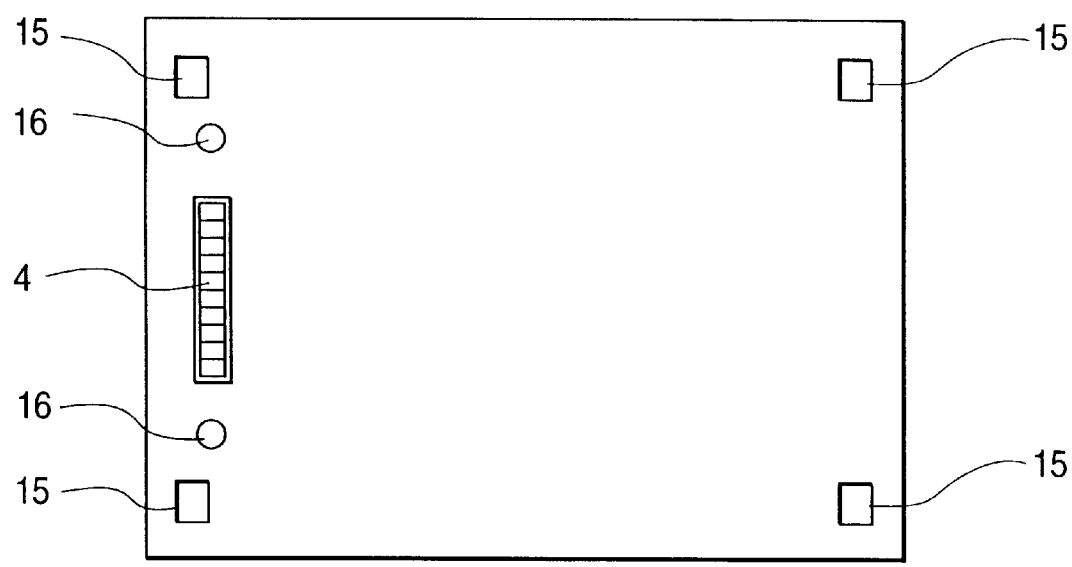
FIG. 3 is a bottom view of the notebook personal computer.

Now the electronic equipment system and the power source control method of the present invention will be clarified by embodiments thereof. FIGS. 1 and 2 are external perspective views of a notebook personal computer (hereinafter simply called "computer") and an expander therefore, respectively in an open state and a closed state of the computer, and FIG. 3 is a bottom view of the computer.

The computer 1 is provided with a display device 10, a keyboard 9, a hard disk drive (not shown), a floppy disk drive 12 etc. The expander 2 is provided therein with a CD-ROM drive 13 and an expansion board (not shown) for communication, for sound source etc. In the following description of the present embodiment, the computer 1 will be called a core unit while the expander 2 will be called a docking unit.

On the front faces of the core unit and the docking unit there are mounted intelligent batteries 3C, 3D provided with LED's for indicating the remaining battery capacity. At the lateral face of the core unit and on the rear face of the docking unit there are respectively provided insertion slots 6C, 6D for AC adapters, and between the display unit 10 and the keyboard 9 of the core unit there are provided a power switch 11 and LED's (not shown) for indicating the status such as information relating to the keyboard and the charging status.

At the four corners of the upper face of the docking unit there are provided hooks 5, 6 for mechanical coupling of the docking unit with the core unit. The left-side hooks 6 are formed as movable hooks linked with a releasing lever 8. Between the left-side hooks 6 there is provided a docking connector 4 of the docking unit for electrical connection between the core unit and the docking unit. On both sides of the docking connector 4, there are provided impingement pins 7.

On the rear face of the core unit there are provided, as shown in FIG. 3, engaging holes 15, 16 for engaging with the hooks 5, 6 of the docking unit, engaging holes 16 for engaging with the impingement pins 7 of the docking unit, and a docking connecting 4 of the core unit side to be connected with the docking connector 4 of the docking unit side.

Figure 4:
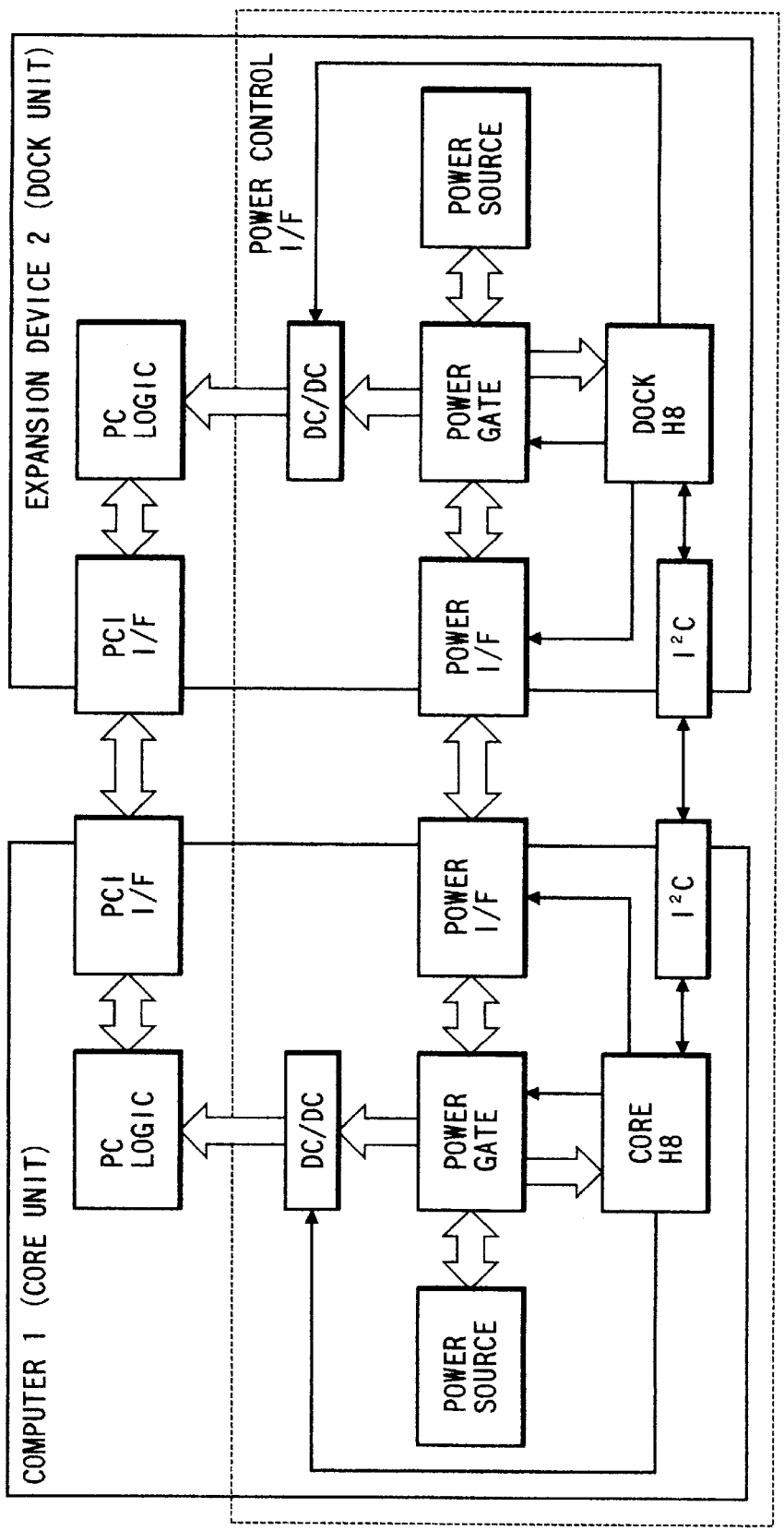
FIG. 4 is a block diagram showing electrical connection of a core unit and a dock unit.

FIG. 4 is a block diagram showing the electrical connection between the core unit and the docking unit. In each side, there are provided a PC logic system which functions only during the function of a DC/DC converter (namely only during a power-on state) and a power source system which always functions as long as a power source is present, regardless of the status of the DC/DC converter, and controls the power source such as a battery or an AC adapter and the DC/DC converter.

In the present embodiment, a one-chip microcomputer H8 (manufactured by Hitachi Mfg. Co.) is employed as the microcomputer for controlling the electronic elements of the power source system. As shown in FIG. 4, the core unit and the docking unit respectively have DC/DC converters and have similar circuit configurations. In this manner it is rendered possible to reduce the number of signal lines connecting the core unit with the docking unit and to realize a flexible computer system which will not be limited by the power supply in case of future expansion of the functions in the core unit or in the docking unit.

Figure 5:
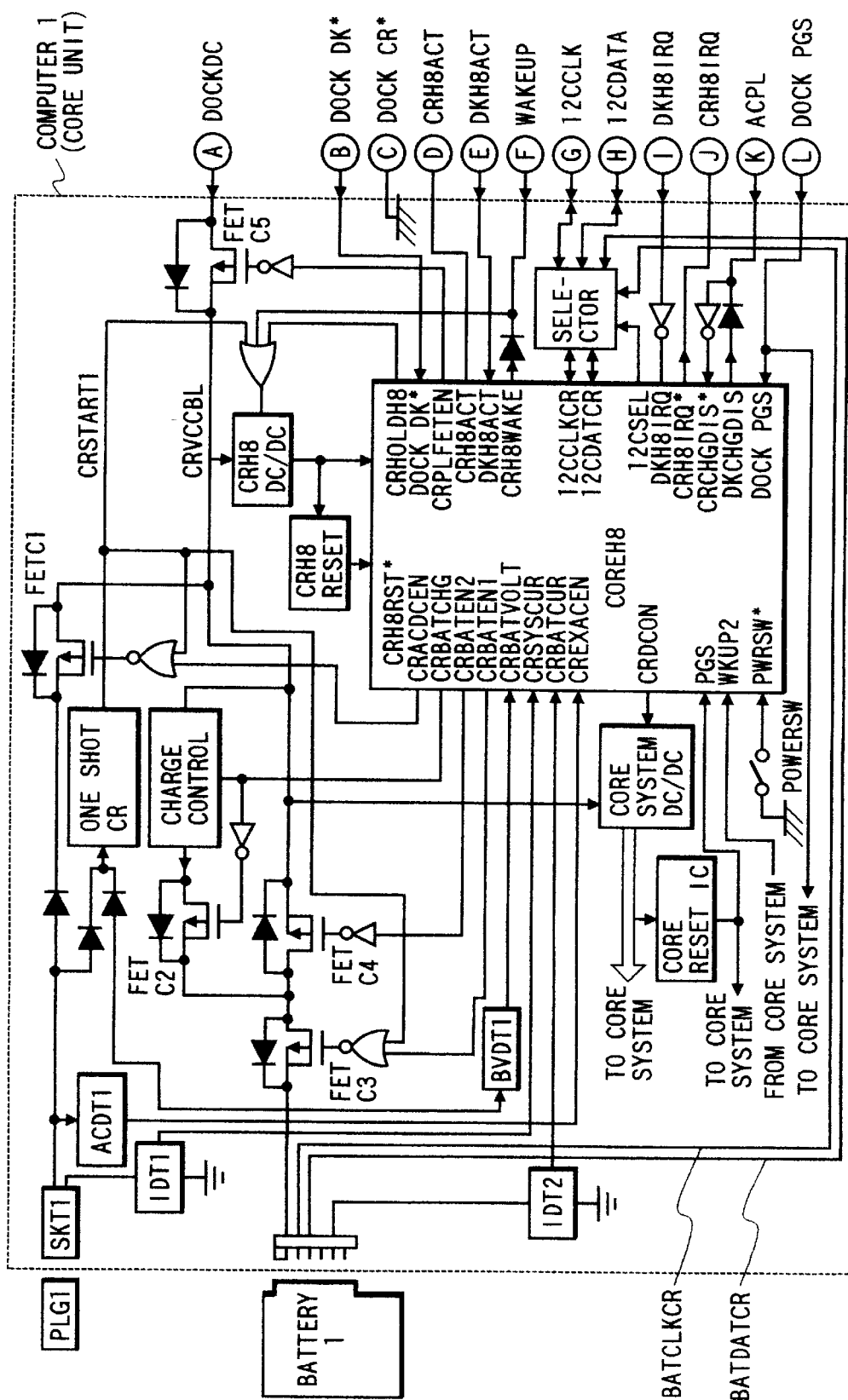
FIGS. 5 and 6 are circuit diagrams showing electrical connection between the core unit including a one-chip microcomputer H8 and the dock unit.
Figure 6:
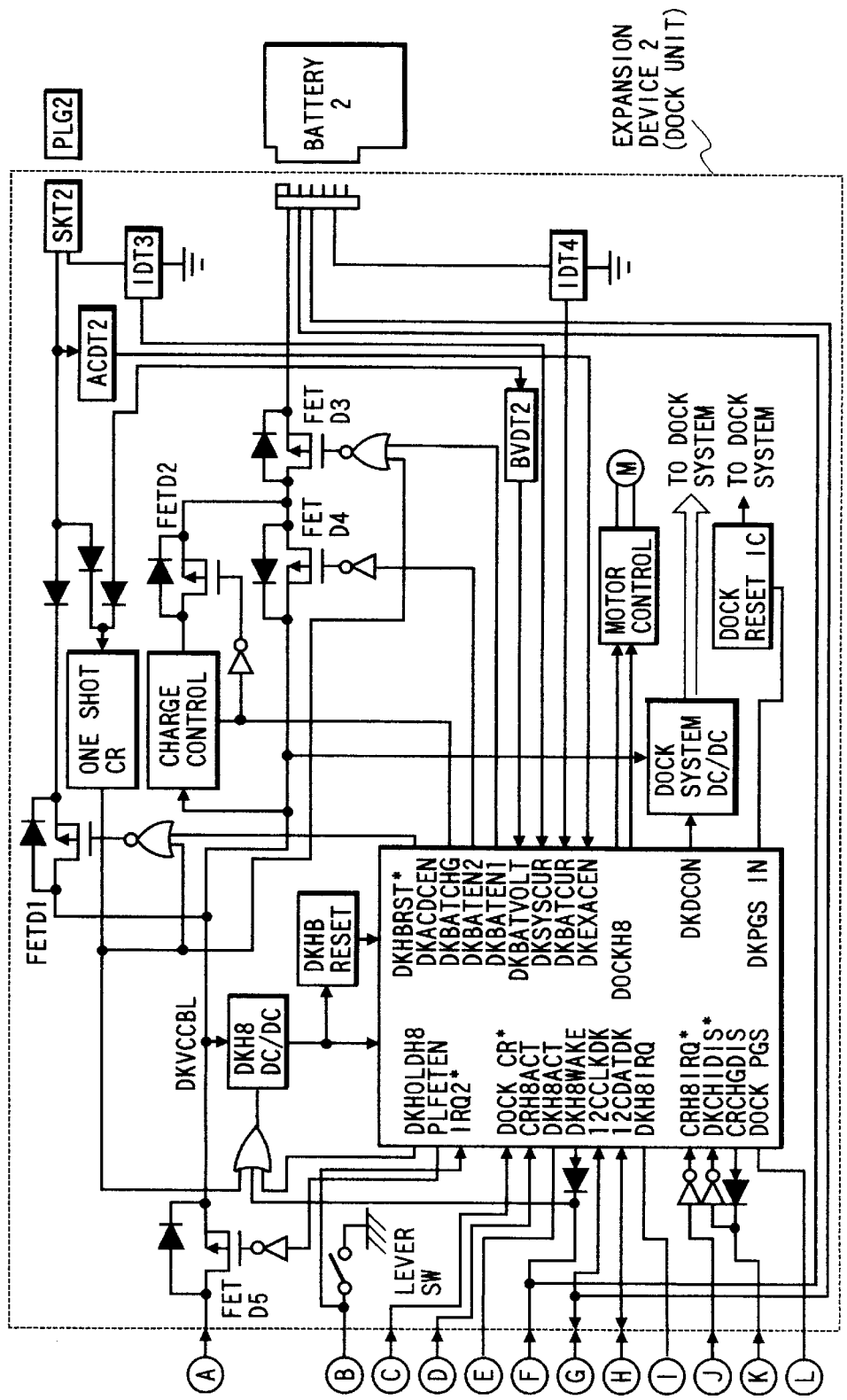

FIGS. 5 and 6 are circuit diagrams showing the electrical connection between the core unit and the docking unit with their its one-chip microcomputers H8. The one-chip microcomputer H8 of the core unit (Core H8) and that of the docking unit (Dock H8) have common signals, including output signals HOLDH8 (CRHOLDH8, DKHOLDH8) for securing the power supply to these microcomputers, output signals PowerFET (ACDCEN/BATEN2/BATEN1) for controlling the electrical connection of the AC adapters or the batteries, input signals (SYSCUR/BATVOLT/BATFCUR) for monitoring the output status of the AC adapter and the charge/discharge state of the battery, a signal BATCHG for controlling the start and termination of the charging, an output signal DCON for controlling the DC/DC converter for power supply to the PC logic system, and an input signal PGS for confirming the stability of the output.

In the absence of the power source, namely in case of absence of the AC adapter or the battery (including the case of absence of the remaining capacity), a control signal PLFETEN is released for effecting power supply from the power source of the other side through a power line DOCKDC in the docking connector 4.

For recognizing the electrical connection between the core unit and the docking unit, signals DOCK_DK* and DOCK_CR* are respectively supplied to the microcomputers Core H8 and Dock H8. The DOCK_DK* signal is generated by a lever switch positioned close to the releasing lever 8 and assuming a low signal state when the releasing lever 8 is closed (cf. FIG. 5). The signal of the lever switch is also supplied, as an interruption signal, to IRQ2* of the microcomputer Dock H8.

Between Core H8 and Dock H8 there are provided power controlling I/F signals including a CRT8ACT signal for principally informing the Dock H8 of the active/inactive status of the Core H8, a DKH8ACT signal for informing the Core H8 of the active/inactive status of the Dock H8, and a WAKEUP signal for initiating the power supply to the microcomputer H8 of the other side through a H8DC/DC circuit in case the ACT signal of the other side is inactive.

The communication between the Core H8 and the Dock H8 is executed utilizing the hardware function incorporated in the microcomputer H8 and according to a SMB (system management bus) protocol in an I2C bus of the docking connector 4. In this communication, the Core H8 always functions in the master mode while the Dock H8 functions in the slave mode. Thus the Dock H8 detects the change in the status of the AC adapter or the battery in the docking unit and releases a signal DKH8IRQ for requesting, to the Core H8, a communication for acquiring the status. This DKH8IRQ signal also functions as a trigger signal for resetting the Core H8 from the Dock H8 in case the power source of the docking unit side changes in the soft standby state in the docked state. Also a trigger signal CRH8IRQ is provided for resetting the Dock H8 from the Core H8.

The I2C bus of the docking connector 4 is also connected to the battery (battery 2) of the docking unit, so that the Core H8 and the Dock H8 can acquire various information of the battery 2 by the smart battery function. In case the Core H8 acquires the various information from the battery 1 of the core unit, the bus connection is switched only to the core unit side by a I2C bus selector control signal I2CSEL in order to prevent the collision of the SMB addresses between the batteries 1 and 2.

Also in case the power consumption of the PC logic system increases possibly beyond the rated power of the AC adapter in the course of the charging operation in the power-on mode, an ACPL signal is released in order to urgently interrupt the charging operation.

In the docking connector 4, there is also provided a signal DOCK_PGS supplied from the Dock H8 to the Core H8 after confirmation of the stable oscillation state of a system DC/DC circuit of the docking unit. This signal is also supplied to the PC logic system to trigger, when rendered active, the docking sequence of the PC logic system.

For the Core H8 only, there are provided an input signal PWRSR* from the power switch 11, and a pulse clock signal WKUP2 supplied to the Core H8 from a chip set (not shown) of the PC logic system in a suspended mode.

For the Dock H8 only, there is provided a motor controlling output signal for an electronic locking mechanism provided in the vicinity of the releasing lever 8 for retaining the same in position.

In the following there will be explained the control sequences of the Core H8 and the Dock H8 in the battery-driven state of the computer. As the basic functions are common for the Core H8 and the Dock H8 except for certain functions such as the electronic lock control by the Dock H8, the following control sequence is common for the Core H8 and the Dock H8 unless specified otherwise.

Figure 7:
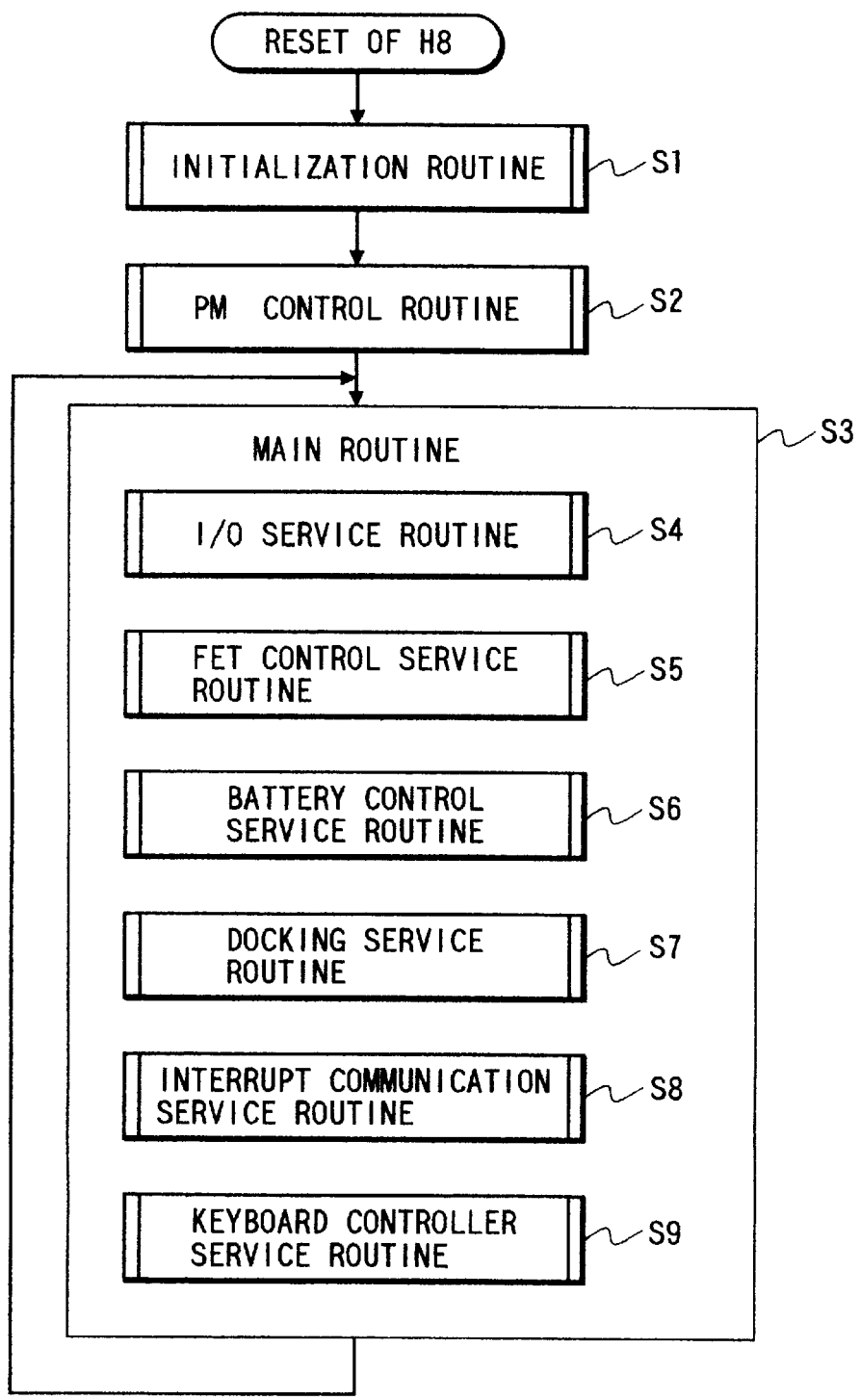
FIG. 7 is a flow chart showing the entire control sequence executed by the one-chip microcomputer H8.

FIG. 7 is a flow chart showing the entire control sequence executed by the one-chip microcomputer H8. This sequence is executed only one after the resetting of the Core H8.

At first there is executed an initialization routine (step S1) for initialization of the I/O ports, initialization of the internal RAM, setting of interruptions and A/D conversion and initialization of the internal modules such as I2C. Then executed are a PM (power management) routine for controlling the power supply state of the microcomputer H8 itself (step S2) and a main routine for controlling the execution/nonexecution of the service routines to be explained later (step S3).

The main routine (step S3) can be divided function wise into an I/O service routine (step S4) executed at an interval of 10 msec for monitoring various input/output signals, an FET control service routine (step S5) for controlling FET's based on the results of detection in the I/O service routine, a battery control service routine (step S6) executed at an interval of 100 msec principally for controlling the charging of the battery and detecting the remaining capacity thereof, and a docking service routine (step S7) for executing processes related to the power line and the FET's at the docked state.

In response to a request for communication by the DKH8IRQ signal from the Dock H8, the Core H8 executes an interruption communication service routine (step S8) for acquiring the interruption right for the Dock H8, according to the SMB protocol. Also while the power supply is turned on (during the power supply to the system from the DC/DC circuit thereof), the Core H8 executes a 8042-compatible keyboard controller service routine (step S9) provided also with a so-called 8051-compatible function (internal keyboard scanning function).

In the present embodiment, there will be given detailed explanation, among the control routines mentioned above, the initialization routine, the PM control routine and the docking service routine which are particularly closely related to the present invention.

Initialization Routine

Figure 8:
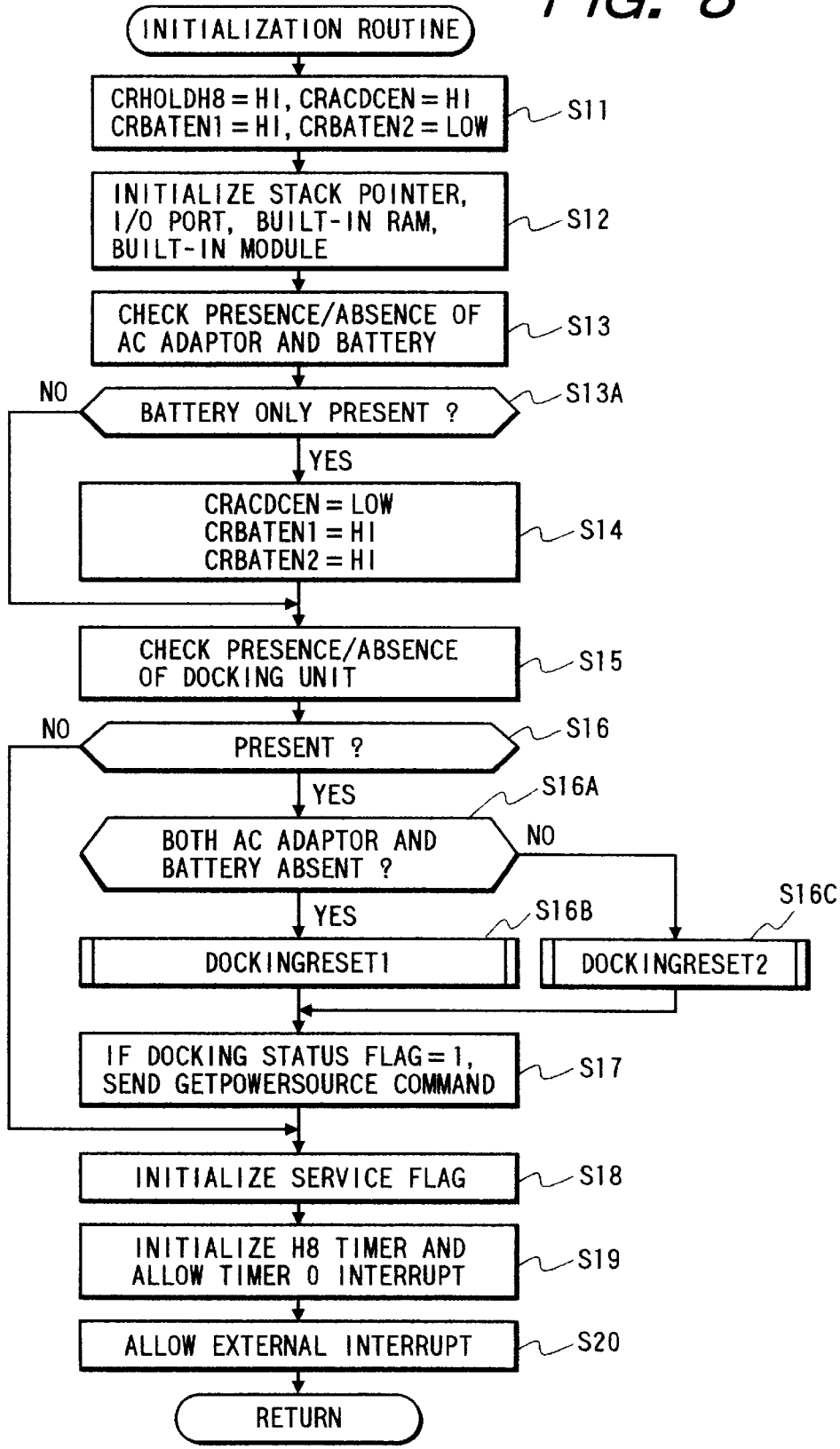
FIG. 8 is a flow chart showing the control sequence of an initialization routine.

FIG. 8 is a flow chart showing the control sequence executed in the initialization routine. When the user attaches the AC adapter or the battery 1 to the core unit, a signal CRSTART1 released from a one-shot circuit of the core unit is rendered active for a period of 50 msec.

The CRSTART1 signal is supplied, through an OR connection with some other signals (a WAKEUP signal and a CRHOLDH8 signal from the Dock H8, to be explained later in the initialization process in the docked state), to a CRH8DC/DC circuit, which is activated to effect power supply to the Core H8 during the active state (50 msec) of the CRSTART1 signal. At the same time a CRH8Reset circuit maintains a CH8RST* signal at the low-level state and then it is returned to the high-level state, whereupon a reset sequence of the Core H8 is initiated.

The Core H8 renders a CRHOLDH8 signal active, in order to secure the power supply to the Core H8 itself after the power supply for 50 msec by the one-shot circuit. It also renders signals CRACDCEN and CRBATEN1 active, thereby tentatively connecting the power source to the CRH8DC/DC circuit (step S11).

Then, as in the initialization of the ordinary microcomputers, there are executed initialization of the stack pointer, the input/output directions of the I/O ports and the internal RAM, and initialization of modules incorporated in the microcomputer such as A/D conversion, various timer routines, I2C bus routine etc. (step S12).

Particularly in the initialization of the I/O ports, a CRPLFETEN signal for controlling the power supply from the core unit to the docking unit is set at the low-level non-active state, and the output signals (CR8ACT/CRH8IRQ/DKCHGDIS) connected to the Dock H8 are set at the input direction even though they are functionally output signals. Such setting is, as will also be explained later in the docking process, to prevent a leak current generated by the entry of a high-level output signal from the Core H8 before the power source voltage is stabilized, in the reset sequence of the Dock H8.

The presence or absence of the AC adapter is confirmed by a CREXACEN signal, and the presence or absence of the connection of the battery 1 is judged from the A/D converted value of a signal CRBATVOLT.

If the battery 1 alone is present, the power FET is shifted, from the tentative setting in the step S11, to CRACDCEN (low), CRBATEN1 (high) and CRBATEN (high) (step S14). If the AC adapter is present, the tentative setting of power FET in the step S11 is retained.

The power supply is executed from the AC adapter since it has an output voltage of 20 V, while the battery has an output voltage of 16 V at maximum. In case the AC adapter is extracted, the power supply is switched to the battery without intervention of the software, so that the shut-down of the computer by the disconnection of the power source can be avoided.

In the initialization routine, there is then executed the adjustment of the power FET setting according to the connection state of the docking unit. At first the presence or absence of connection of the docking unit is checked by a DOCK_DK* signal (step S15). If the DOCK_DK* signals in the high-level state, indicating the absence of docking, the setting of the power FET is retained and the sequence branches to a final sequence of the initialization routine, starting from a step S18 (step S16).

On the other hand, the low-level state of the DOCK_DK* signal indicates generation of resetting in the Core H8 in the docked state, or, more specifically, a case where the AC adapter or the battery is connected to either of the core unit and the docking unit which have been in the docked state without any power source (namely the AC adapted and the battery are not connected to the core unit and the docking unit).

Figure 9:
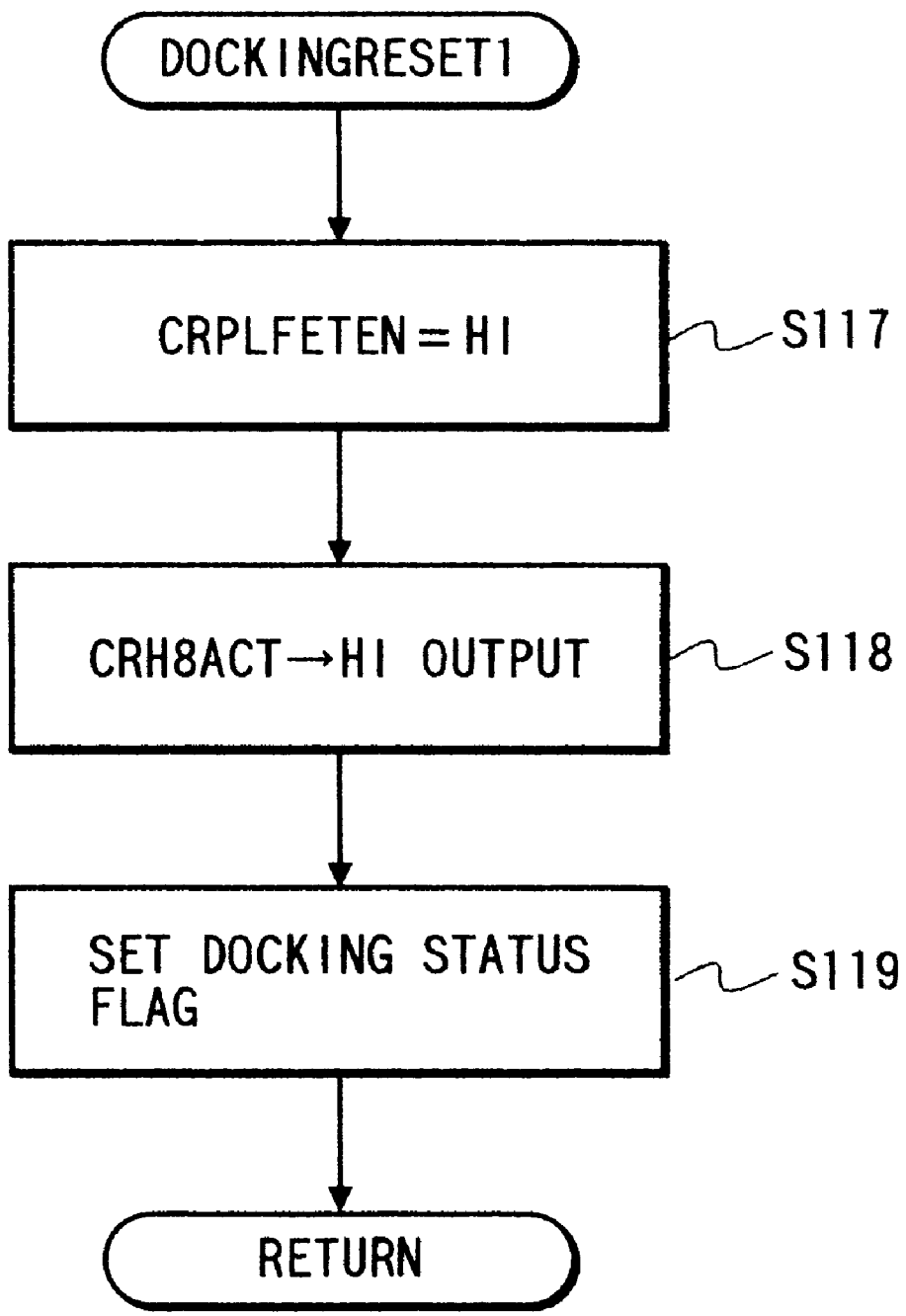
FIG. 9 is a flow chart showing the control sequence of a Docking Reset 1 routine.

If the AC adapter and the battery 1 are both unconnected (step S16A), the connection of the power source is made to the docking unit, so that the power supply to the core unit is made from the docking unit (the other side) through the FET's d5 and c5, whereby the Core H8 is activated by the CRH8DC/DC circuit. In this case there is executed a DockingReset1 process (step S16B), of which control sequence is shown in FIG. 9.

In this process, the CRPLFETEN signal has a low-level initial value. Since the power supply through the FET c5 is made through a diode and is inefficient, the Core H8 switches the CRPLFETEN signal to the high-level in order to make direct connection of the power supply line from the docking unit side to the core unit side (step S17).

The power supplying side judges whether the power supply by the docking process has been successful by a signal ACT from the other side. The Core H8 switches a CRH8ACT signal, which is directed to the input at the undocked state, to a high-level output signal (step S118) thereby informing the Dock H8 that the power supply has been successful and that the initialization of the Core H8 has been successful, and sets a docking status flag (step S119) which is to be used by other service routines for confirming the docking status.

Figure 10:
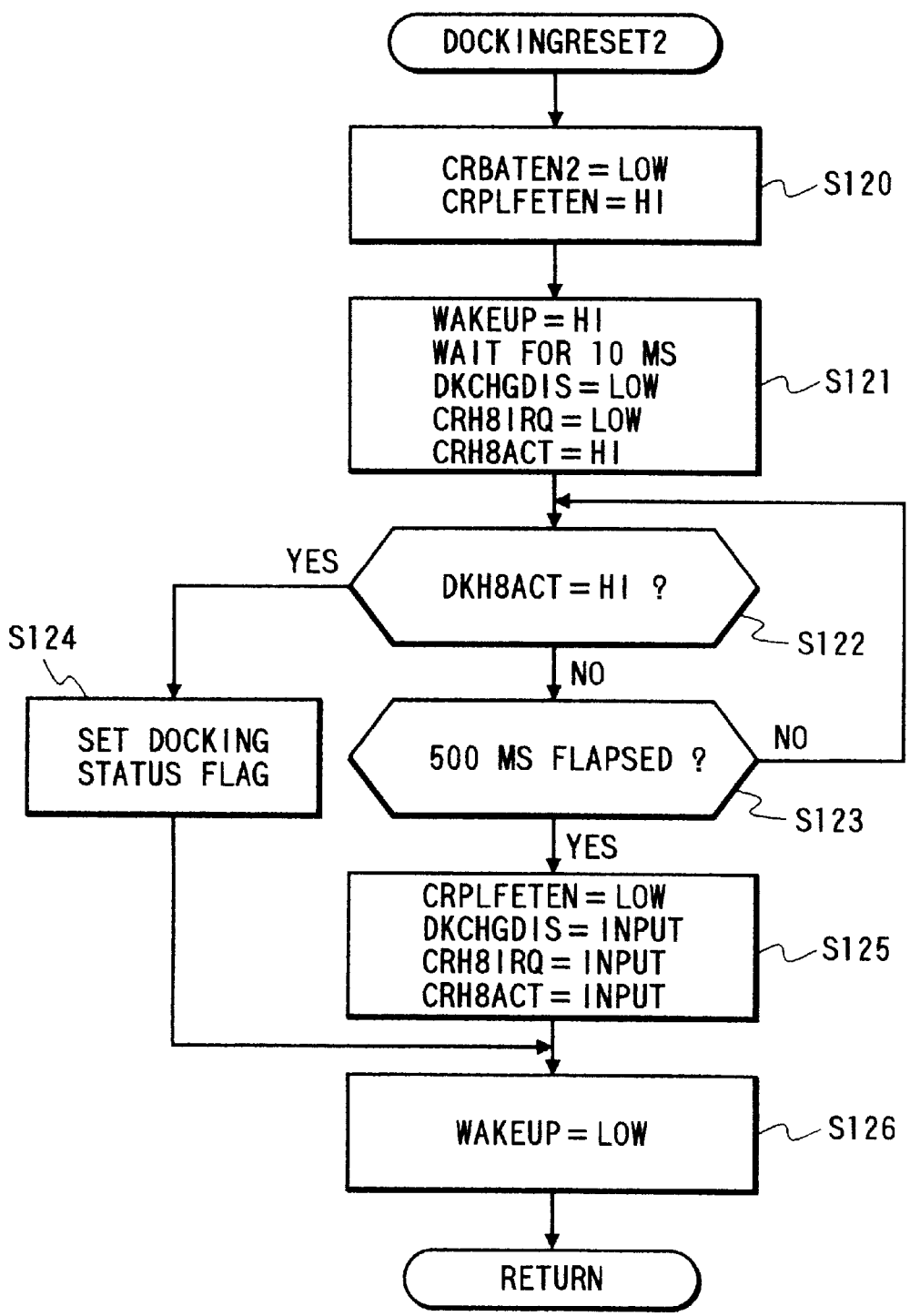
FIG. 10 is a flow chart showing the control sequence of a Docking Reset 2 routine.

On the other hand, if the step S16A judges the connection of the AC adapter or the battery 1, the connection of the power source is made to the core unit which has been without the power source, so that the initialization process is required to effect the power supply from the core unit side to the docking unit side. In this case there is executed a DockingReset2 process (step S16C), of which control sequence is shown in FIG. 10.

At first a signal CRBATEN2 is rendered non-active (low-level state) in order to prevent the current flow into the battery, and then the CRPLEFETEN signal is rendered active (high-level state) to initiate the power supply from the power source of the core unit to the docking unit (step S120). In this manner there is initiated the power supply to the DKH8DC/DC circuit which the power source circuit for the Dock H8.

Also the WAKEUP signal is rendered active to initiate the power supply from the DKH8DC/DC circuit to the Dock H8. After the lapse of a predetermined time (10 msec) for stabilizing the power source voltage of the Dock H8, the ports which have been set for input in the step S12 by the output signal to the Dock H8 are switched for output (step S121), whereby the DKCHGDIS and CRH8IRQ signals are set at the low-level while the CRH8ACT signal is set at the high-level.

The activation of the WAKEUP signal in the step S121 also initiate the power supply to the Dock H8, whereby a process equivalent to the steps S11 to S16B in the initialization routine of the Core H8 is executed in the Dock H8. Within a period of 500 msec, the Core H8 palls if the DKH8ACT signal from the Dock H8 has been switched from the low-level to the highlevel state (steps S122, S123).

Upon detection of the high-level state of the DKH8ACT signal, there is set a docking status flag (step S124), and the WAKEUP signal which has been rendered active in the step S121 is switched to the non-active state (step S126).

On the other hand, if the high-level state of the DKH8ACT signal cannot be detected within the period of 500 msec, the power supply from the core unit side to the docking unit side or the resetting of the Dock H8 is incomplete, so that the Core H8 shifts the CRPLFETEN signal, which has been rendered active in the step S120, to the non-active state to terminate the power supply from the core unit to the docking unit and returns the signals supplied to the Dock H8 to the initialization state in the step S12 (step S125), and the sequence branches to the final process of the initialization routine starting from the step S17.

In case the docking status flag is set at "1", the 12C bus is switched to the docking unit side, then a GetPowerSource command is sent to the Dock H8 and the initial value of the power source in the docked state is acquired from a returned value (step S17).

In the final process of the intializatio routine, there are executed initialization of service flags for controlling the execution/non-execution of various service routines (step S18), initialization (setting at 1 msec) of an H8 internal timer 0 constituting a reference timer for periodically executing an I/O service routine, a battery control service routine etc. and permission of a timer 0 interruption (step S19), and setting for an external interruption by an external interruption signal such as the DOCK_DK* signal for triggering the execution of a docking service routine to be explained later or the DKH8IRQ* signal for triggering an interruption communication service routine (step S120), and the sequence then branches to the PM control routine in the step 2.

PM Control Routine

The one-chip microcomputer H8 can assume three power supply (normal/sleep/soft standby) modes. For example, for the power source of 5 V (10 MHz), the current consumption is 20 mA (normal), 12 mA (sleep) or 0.01 mA (soft standby).

Therefore, in the battery-driven state, namely in a state where the AC adapter is not attached, it is possible to extend the battery-driven time by assuming the soft standby power mode if the power consumption of the microcomputer H8 is not negligible in comparison with the power consumption of the entire system.

The Core H8 shifts to the soft standby mode in the following two cases:

(1) if the power supply of the system is turned off in the battery-driven state (off mode soft standby); or
(2) if the system is in the suspended mode in the battery-driven state (on mode soft standby).

In the present embodiment, the suspended mode means a state where the operation clock signals are not generated for almost all the devices of the system and the power supply is stopped to certain devices of high power consumption such as the display device, whereby the current consumption of the system is in the order of 100 mA.

The power-off state is judged in the I/O service routine, by the status of a CRDCON signal supplied to the core system DC/DC circuit. Also the suspended mode of the system can be detected by monitoring, in the I/O service routine, a signal PC2 which is released from the chip set of the system and entered into the external interruption port of the Core H8.

After entering the soft standby mode, the Core H8 recovers therefrom in the presence of one of the following external interruption signals:

AC adapter presence signal (CREXACEN*);
power switch on signal (PWRSW*);
suspend release signal (PC2*);
PC3 signal (WKUP2);
docking signal (DOCK_DK*);
communication request signal (DKH8IRQ*) from the Dock H8

These external interruption signals are enabled, depending on the above-mentioned mode (1) or (2) and on the presence or absence of the docked state.

If the system is in the docked state at the shifting to the soft standby mode or at the returning therefrom, the communication by the 12C bus may not be conducted properly if the power mode is not synchronized between the Core H8 and the Dock H8. In the soft standby state, all the functions of the one-chip microcomputer H8 are suspended, so that the 12C module function cannot be used.

The PM control routine is a service routine for controlling the conditions and the timing of shift and return of the microcomputer H8 to and from the soft standby mode.

Figure 11:
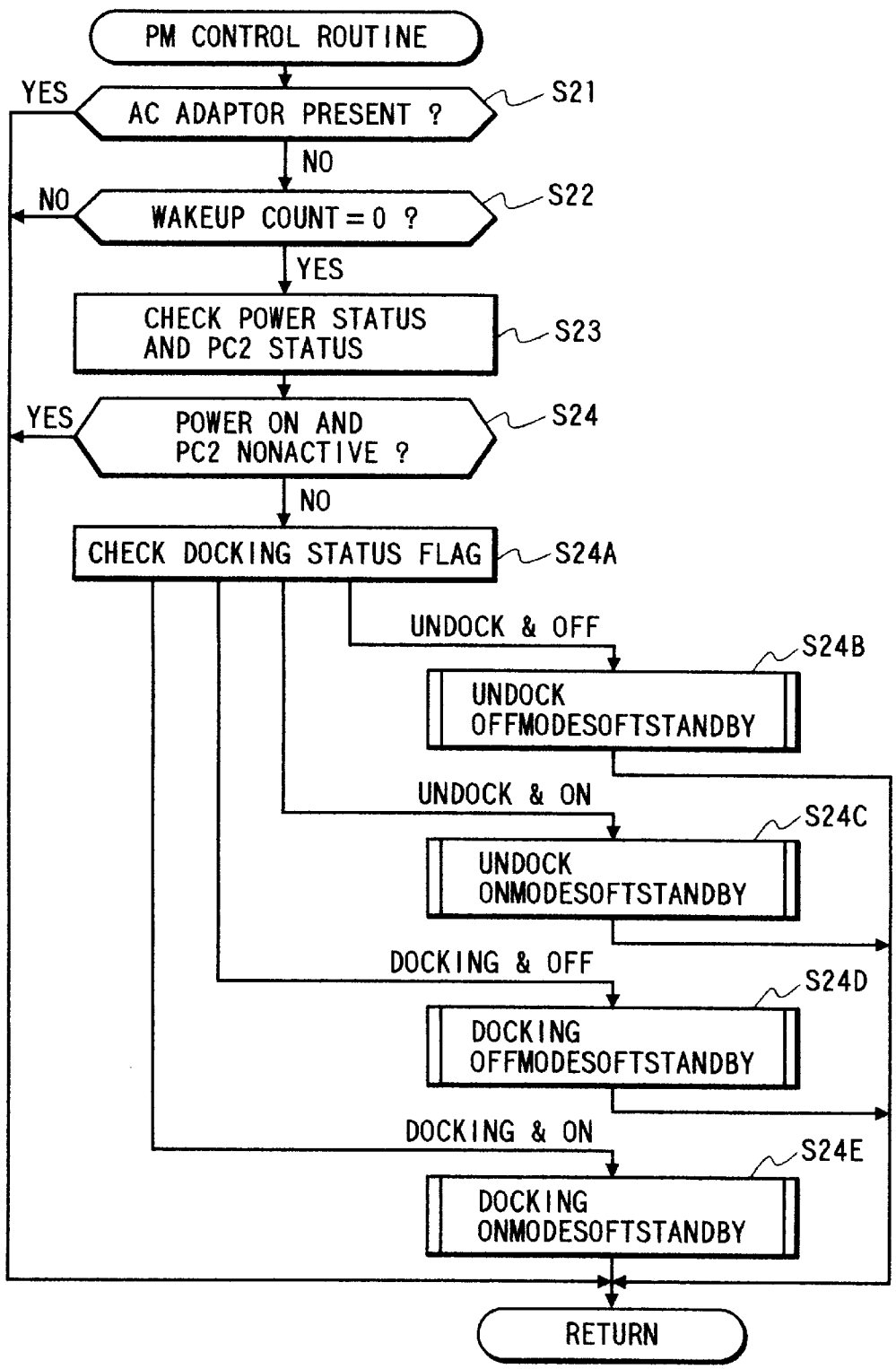
FIG. 11 is a flow chart showing the control sequence of a PM control routine.

FIG. 11 is a flow chart showing the control sequence of the PM control routine. At first there is checked the AC adapter flag set in the I/O service routine (step S21), and, if the AC adapter is present, the present service routine is immediately terminated. This flag indicates, in the undocked state, the presence or absence of the AC adapter in the core unit, and, in the docked state, the presence or absence of the AC adapter in either of the core unit and the docking unit.

In case the AC adapter is absent, there is checked the value WAKEUP_COUNT in the internal RAM (step S22), and, if this value is not 0, the present service routine is terminated. The value WAKEUP_COUNT is set, in case of generation of an external interruption of a returning factor in the soft standby state, at the following value according to such returning factor:

AC adapter presence signal (CREXACEN*)=10
power switch on signal (PWRSW*)=10
suspend release signal (PC2*)=2
PC3 signal (WKUP2)=2
docking signal (DOCK_DK*) =100
communication request signal (DKH8IRQ*) from Dock H8=10

For example, the AC adapter flag is not immediately set by the shift of the AC adapter presence signal (CREXACEN*) to the low-level state. In consideration of the influence of chattering, the AC adapter flag is set only after the low-level state is detected 5 times in succession (namely only if the low-level state is maintained for 50 msec) in the I/O service routine.

In case the returning from the soft standby state is triggered by the CREXACEN* signal, a value 10 is set as WAKEUP_COUNT. This value is decreased by 1 at a cycle time of 10 msec in the timer 0 interruption process executed at an interval of 1 msec, but no longer decreased after reaching 0. Thus, with the lapse of 100 (10×10) msec after the returning from the soft standby state, there is again checked the condition for entering the soft standby state.

In case triggering with the PWRSW* signal, there is similarly secured a time of 100 msec for masking the transition check to the soft standby state in consideration of the chattering in the I/O service routine. Also in case of the DOCK_DK* signal, there is secured a time of 1000 msec for masking the transition check to the soft standby state in consideration of the process time in the docking service routine to be explained later. Thus the process of the above-explained step S22 is minimize the operation time in the normal mode respectively corresponding to the returning factors, while maintaining the matching between the PM control routine and other service routines.

In case the aforementioned step S22 identifies that the value of WAKEUP_COUNT is 0, there are checked the status of the CRDCON signal and that of the PC2 signal fixed in the I/O service routine (step S23), then there are discriminated that the power supply is on and that the PC2 signal is non-active (step S24), and, if the power supply is on and the PC2 signal is non-active (namely in case the system is not in the suspended mode), the present service routine is immediately terminated.

Otherwise, there is checked the status of a docking status flag fixed in the I/O service routine (transition from the docked state to the undocked state) or in the docking service routine (transition from the undocked state to the docked state) (step S24A), and there is executed one of the transitions to the soft standby state in the following four patterns, according to the combination of the above-mentioned status and the status of the AC adapter (steps S24B to S24E):

(1) off-mode soft standby in the undocked state;
(2) on-mode soft standby in the undocked state;
(3) off-mode soft standby in the docked state;
(4) on-mode soft standby in the docked state.

Figure 12A:
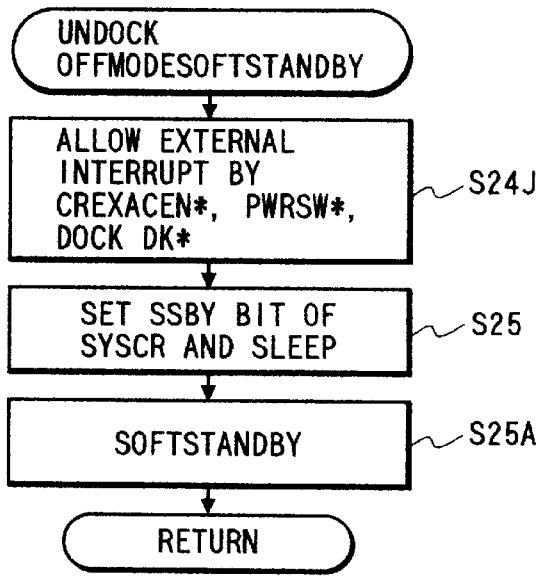
FIGS. 12A, 12B and 12C are flow charts showing the control sequence of a Soft Standby transition and a returning process in the undocked state.
Figure 12B:
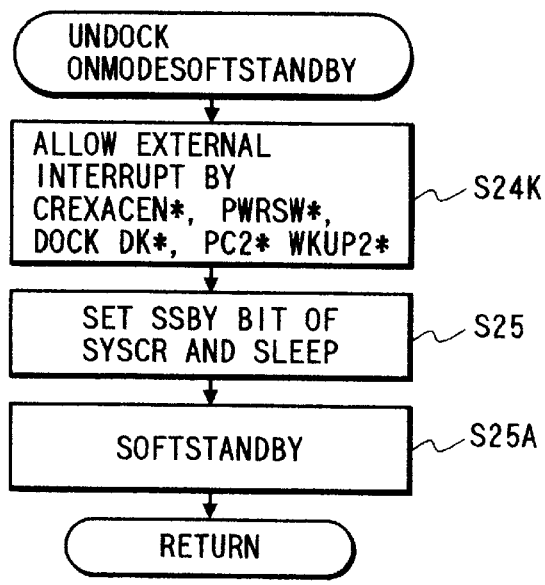
Figure 12C:
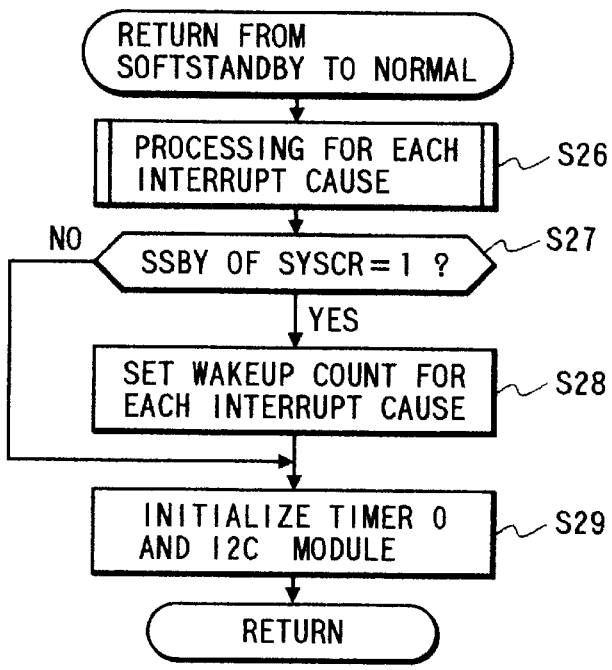

FIGS. 12A to 12C are flow charts showing the sequence of transition to and returning from the soft standby state in the undocked state. The system shifts to the soft standby state, while allowing the external interruption by the AC adapter presence signal (CREXACEN*), the power supply on signal (PWRSW*) or the docking signal (DOCK_DK*) as the returning factor in the above-mentioned case (1) as shown in FIG. 12A (step S24J) or taking also the suspend release signal (PC2*) or the PC3 signal (WKUP2) as the additional returning factors in the above-mentioned case (2) as shown in FIG. 12B (step S24K).

The transition from the normal mode to the soft standby state is achieved by setting an SSBY bit of a SYSCR register in the internal register of the one-chip microcomputer H8 and then executing a SLEEP command (step S25).

In response the one-chip microcomputer H8 enters a power-saving state in which the program execution, the clock signals and the peripheral functions are all suspended (step S25A). The recovery from this state is executed only by the external interruption, set in the above-mentioned steps S24J and S24K.

In case any of the above-mentioned returning factor occurs, the one-chip microcomputer H8 executes, after a waiting time of about 10 msec by a hold/wait (H/W) function for stabilizing the clock signals, a process corresponding to such interruption factor as shown in FIG. 12C (step S26). At the end of the interruption process, there is discriminated, by the aforementioned SSBY bit of the SYSCR register, if the interruption is for returning from the soft standby state (step S27), and, if so, there is set a WAKEUP COUNT for each interruption factor (step S28) and the sequence returns from each interruption process to the PM control routine.

Finally the internal modules such as the times 0 and 12C which are stopped during the soft standby state, and the PM control routine is terminated and the sequence is transferred to the main routine (step S29).

Figure 13A:
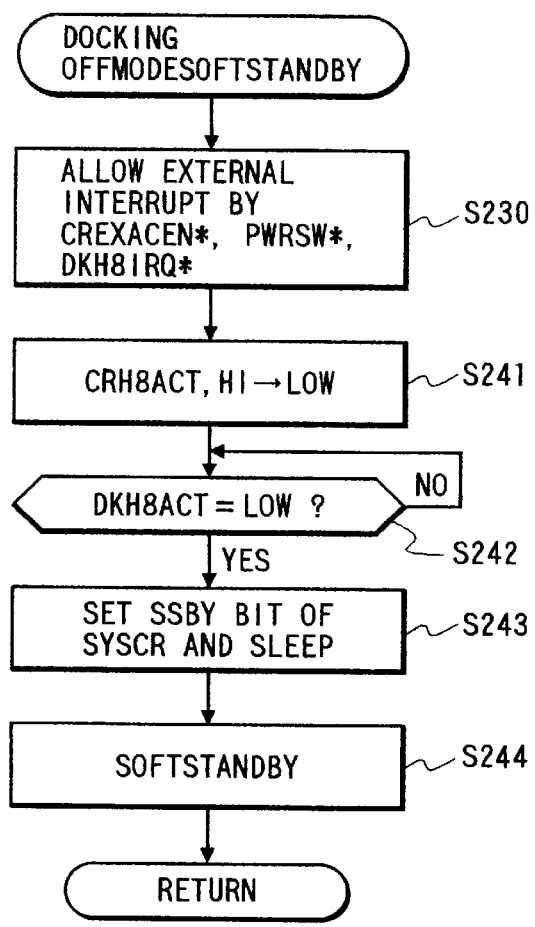
FIGS. 13A and 13B are flow charts showing the control sequence of a Soft Standby transition in the docked state.
Figure 13B:
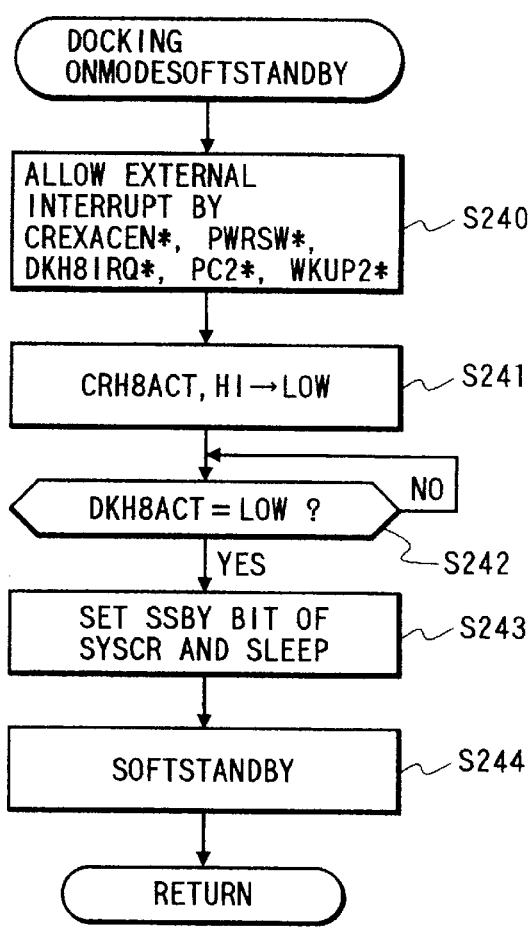

FIGS. 13A and 13B are flow charts showing the sequences of transition to the soft standby state in the docked state. The system shifts to the soft standby state, while allowing the external interruption by the AC adapter presence signal, the power supply on signal or the communication request signal (DKH8IRQ*) from the Dock H8 as the returning factor in the above-mentioned case (3) as shown in FIG. 13A (step S230) or taking also the PC2 and PC3 signals as the additional returning factors in the above-mentioned case (4) as shown in FIG. 13B (step S240).

In the soft standby state in the docked state, the synchronization has to be made with the Dock H8 prior to the transition to such state. The Core H8 shifts the CRH8ACT signal from the high-level state to the low-level state (step S241) and awaits that the DKH8ACT signal, supplied from the Dock H8 to the Core H8, is shifted from the high-level state to the low-level state (step S242). These CRH8ACT and DKH8ACT signals are used as acknowledgment signals for informing the success of the docking process in the aforementioned initialization routine or in the docking service routine to be explained later, but, in a state where the docking is already made, these signals are used as acknowledgment signals for synchronization of the soft standby state.

In the docked state, the Dock H8 monitors the CRH8ACT signal in the I/O service routine. The low-level state of this signal is the condition for transition to the soft standby state at the Dock H8 side. In response to the process of the step S241 in the Core H8, the Dock H8 executes, in the PM control routine, the transition from the normal mode to the soft standby mode.

Figure 15A:
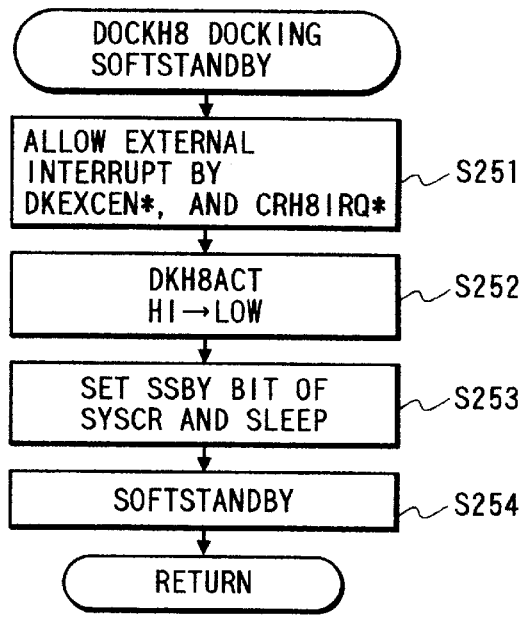
FIGS. 15A and 15B are flow charts showing the control sequence of a Soft Standby transition and a returning process of the docking side in the docked state.
Figure 15B:
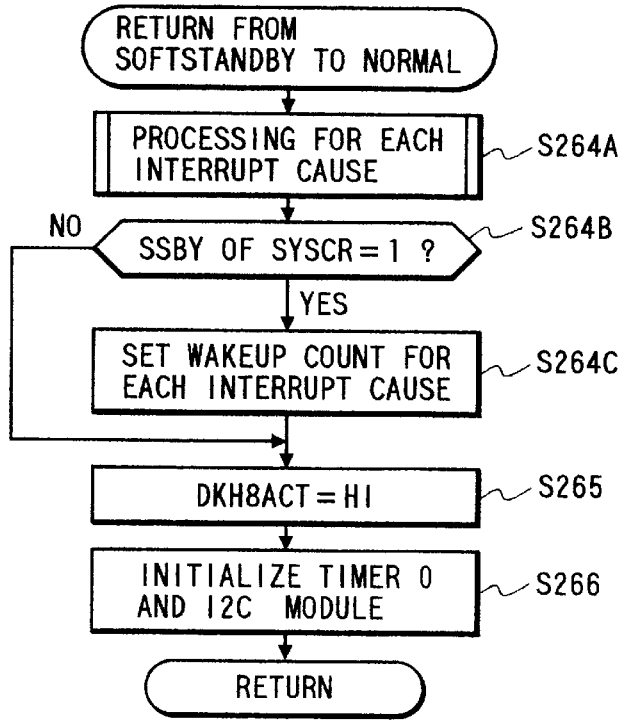

FIGS. 15A and 15B are flow charts showing the sequences, at the docking unit side, of transition to and returning from the soft standby state in the docked state. The sequence allows the external interruption by the AC adapter presence signal (DKEXACEN*), or the communication request signal (CRH8IRQ*) from the Core H8 as the returning factor from the soft standby state as shown in FIG. 15A (step S251), then shifts the DKH8ACT signal from the high-level state to the low-level state (step S252) and shifts to the soft standby mode (steps S253, S254).

In response to the process of the step S252 at the Dock H8, the Core H8 detects the shift of the DKH8ACT signal from the high-level state to the low-level state (step S242) and shifts to the soft standby mode (steps S243, S244).

Figure 14:
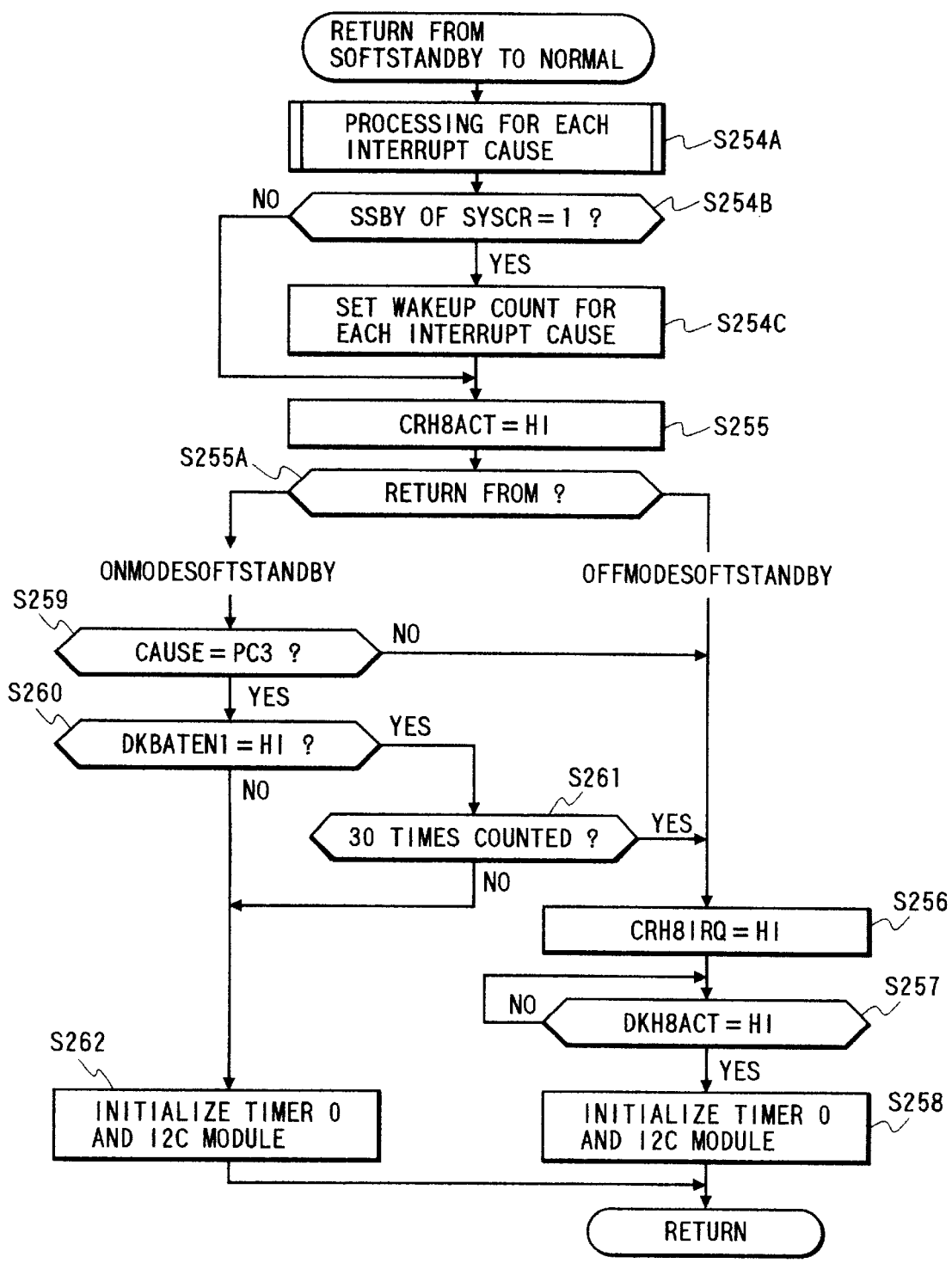
FIG. 14 is a flow chart showing the control sequence of a returning process in the docked state.

FIG. 14 is a flow chart showing the returning process from the soft standby state. In case of the external interruption by any of the returning factors permitted in the aforementioned steps S230 and S240, an interruption process is executed in a similar manner as in the returning steps S26, S27 and S28 in the undocked state for achieving shift to the PM control routine (steps S254A, S254B and S254C), and the CRH8ACT signal is shifted from the low-level state to the high-level state (step S255).

The returning from the off-mode soft standby state (step S255A) is based on a change in the status of the AC adapter or of the power source as explained in the foregoing, and a communication based on the SMB protocol is executed between the Core H8 and the Dock H8 after the returning. In such case, the probability of entering the soft standby state after the returning is very low. Consequently the CRH8IRQ signal is shifted to the high-level state to also recover the Dock H8 from the soft standby mode (step S256).

The Dock H8 returns from the soft standby state by the inverted input signal CRH8IRQ* signal. It returns to the PM control routine by completing the interruption process in a similar manner as in the steps S254A to S254C as shown in FIG. 15B (steps S264A, S264B, S264C), then shifts the DKH8ACT signal to the high-level state for informing the Core H8 of return from the soft standby state (step S265), and resets the internal modules such as the timers 0 and 12C which have been stopped during the soft standby mode, thereby terminating the PM control routine and transfers the control to the main routine (step S266).

In response to the process of the step S265 at the Dock H8, the Core H8 detects the shift of the DKH8ACT signal to the high-level state (step S257), then resets the internal modules which have been stopped as in the Dock H8 (step S258) and terminates the PM control routine.

In the on-mode soft standby state in the docked state in the aforementioned case (4), there is at first discriminated whether the returning factor is the PC3 signal (step S259), and, if not, there are executed the steps S256 to S258 as in the above-explained case (3).

On the other hand, if the returning factor is the PC3 signal (WKUP2), there is executed a special process for extending the battery-driven time. As explained in the foregoing, the PC3 signal is periodically generated in the suspended state, in order to detect the critical level of the battery in the suspended state and to inform the system of the initiation of a SaveToDisk process (diversion of the current user work environment to the hard disk) based on such detection. These processes are executed in the I/O service routine.

The critical level of the battery is to be detected by the intelligent battery itself, but, since the remaining capacity obtained from the battery may contain accumulated errors, the present embodiment improves the reliability by executing the critical level detection based on the A/D converted values of the voltage and the current of the battery.

On the other hand, the remaining battery capacity decreases very gradually if the suspended state is continued in the battery-driven mode. After the critical battery levels is checked in the I/O service routine, the system again shifts to the soft standby mode in most cases, even without communication with the Dock H8.

Since the normal mode and the soft standby mode are significantly different in the electric power consumption, the duration of the suspended state will become limited if the Dock H8 is unnecessarily returned from the soft standby state in the docked state. Therefore, the present embodiment adopts control to minimize the returning of the Dock H8 from the soft standby state for the critical battery level.

In case the step S259 identifies that the returning factor is the PC3 signal, the control is switched according to the connection status of the battery FET. The Core H8 know the status of all the FET's of the core unit and the docking unit, by an FET control service routine.

If the power supply may be made from the battery 2 of the docking unit, namely in case DKBATEN1=Hi (step S260), a PC3WAKEUP_COUNT area of the internal RAM is used to branch, after a count of 30, to a process for the off-mode soft standby state, thereby returning also the Dock H8 from the soft standby mode (step S261).

In this manner the Core H8 returns from the soft standby state for a period of 20 msec in every 2 seconds, but the Dock H8 returns from the soft standby state only for a period of 20 msec in every 60 seconds.

If the power supply is not made from the battery 2 of the docking unit, namely if DKBATEN1=Low, the operations are solely made by the battery 1 of the core unit, so that the periodical check of the remaining battery capacity is not necessary in the Dock H8 side. Consequently, as in the undocked state, there are reset the internal modules which have been stopped (step S262) and the PM control routine is terminated. The Dock H8 does not return from the soft standby state even when the returning factor by the PC3 signal is generated.

Docking Service Routine

The basic control of the docking service routine is similar to that of the initialization process when the AC adapter or the battery 1 is connected to the core unit while the core unit and the docking unit lack the power source in the docked state.

The only difference lies in a fact that other service routines are not yet executed in case of the initialization process but such other service routines have already been executed in case of the docking service routine. Such other service routines include, for example, the battery control service routine and the keyboard controller service routine if the power supply is turned on.

Figure 16:
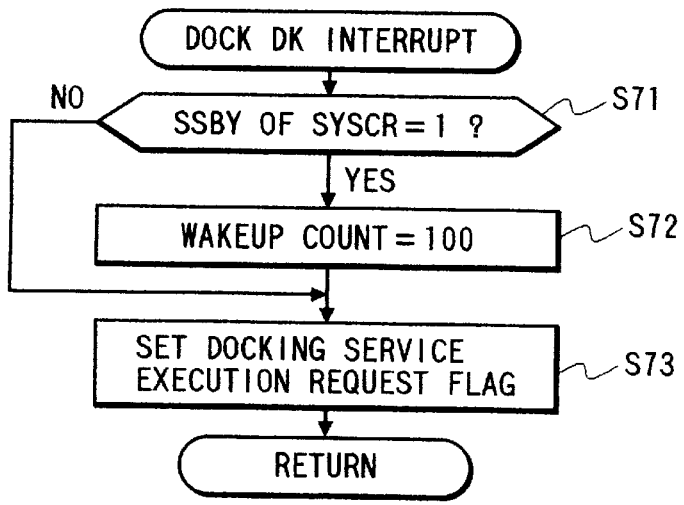
FIG. 16 is a flow chart showing the control sequence of a DOCK_DK* interruption process.

At first there will be explained a pre-process prior to the execution of the docking service routine. FIG. 16 is a flow chart showing a DOCK_DK* interruption process, which is executed when the DOCK_DK* signal is rendered active. There is discriminated, by the SSBY bit of the SYSCR register in the internal control register, whether the returning from the soft standby state is intended (step S71).

If the SSBY bit is 1, indicating the returning from the soft standby state, there is set a value 100 in a work area of the WAKEUP_COUNT in order to mask the next transition to the soft standby state as already explained in the PM control routine (step S72), and there is set a docking service execution request flag which is to be referred to in a timer 0 interruption process to be explained later (step S73), whereupon the DOCK_DK* interruption process is terminated.

On the other hand, if the SSBY bit is 0, there is only executed the setting of the docking service execution request flag and the DOCK_DK* interruption process is terminated.

Figure 17:
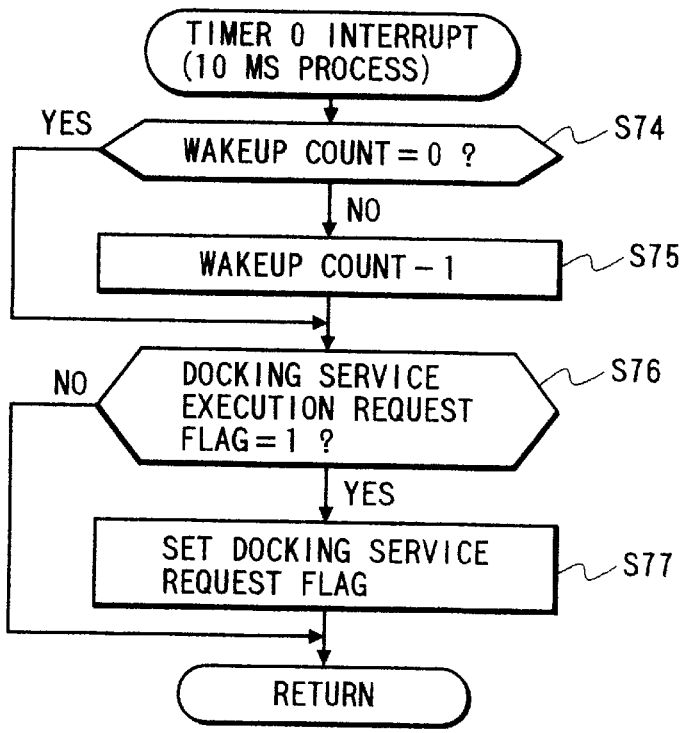
FIG. 17 is a flow chart showing the control sequence of 10 msec cycle process in a timer 0 interruption process.

FIG. 17 is a flow chart showing a 10 msec cycle process in the timer 0 interruption processes. The timer 0 interruption processes includes a 1 msec cycle process, a 10 msec cycle process, a 100 msec cycle process etc. In the 10 msec cycle process, which is executed once for every 10 entries of the type 0 interruptions, there is discriminated whether the value of WAKEUP_COUNT is 0 (step S74), and, if not, this value is decreased by 1 (step S75).

Then there is checked the docking service execution request flag (step S76), and, only if the flag is 1, there is set a docking service request flag which is to be referred to in the main routine (step S77). The docking service execution request flag is cleared in a final sequence of the docking service routine to be explained later.

Figure 18:
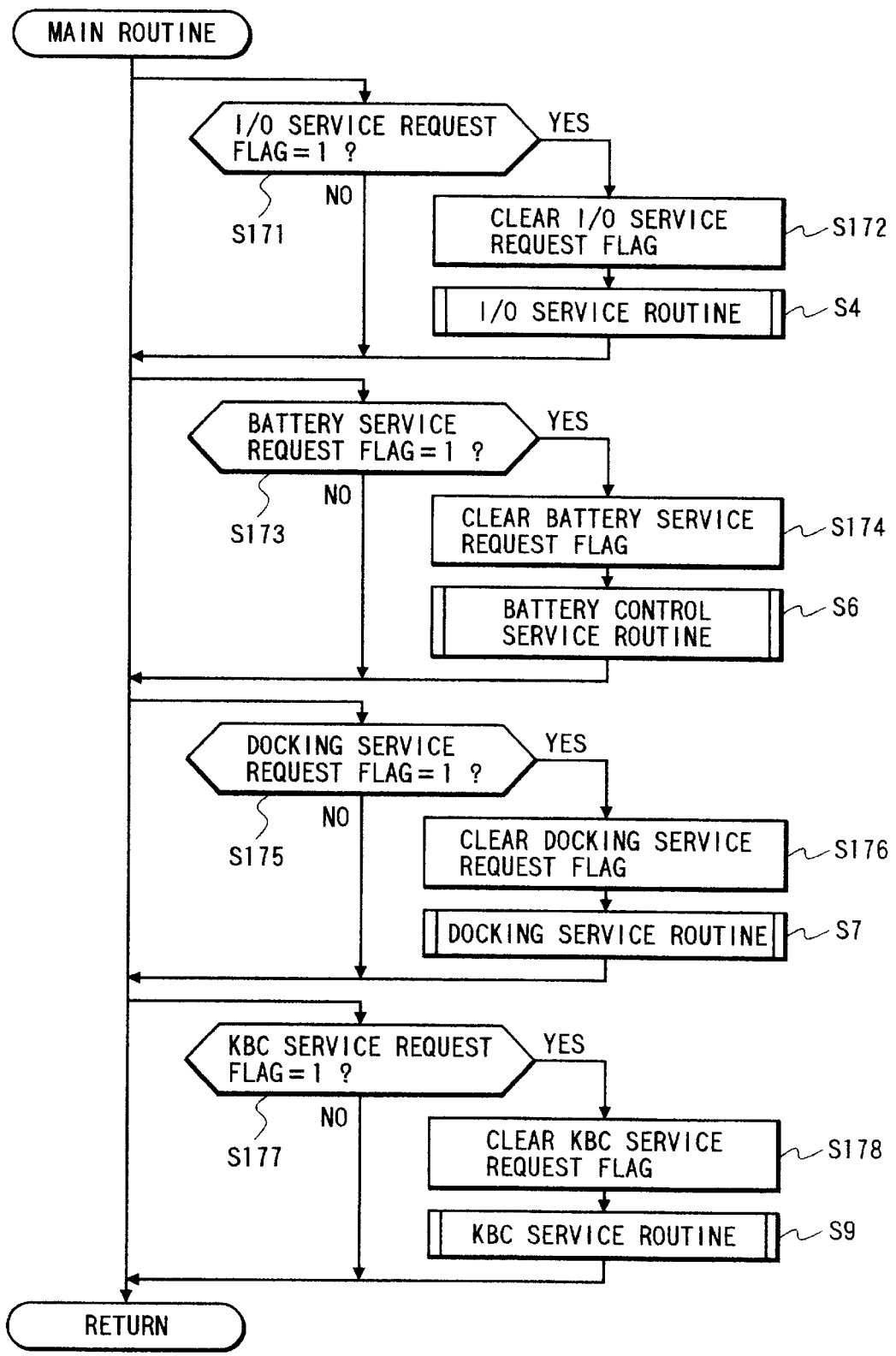
FIG. 18 is a flow chart showing the control sequence of the main routine in a step S3.

FIG. 18 is a flow chart showing the process of the step S3 in the main routine. In the main routine, there are checked the states of the flags (steps S171, S173, S175, S177), and, if the docking service request flag is set (step S175), the flag is reset (step S176) as in the cases of flags for other service routines (steps S172, S174, S178) and the docking service routine is called (step S7). Subsequently the sequence returns to the checking of the service request flags. In FIG. 18 there are only shown the I/O service routine, the battery control service routine, the docking service routine and the keyboard controller (KBC) service routine.

The above-explained steps S71 to S77, S176 and S7 allow to execute the docking service routine at an interval of 10 msec until the completion of the docking process, without detrimental effect on other service routines, in case the user combines the core unit and the docking unit and closes the releasing lever 8.

Figure 19:
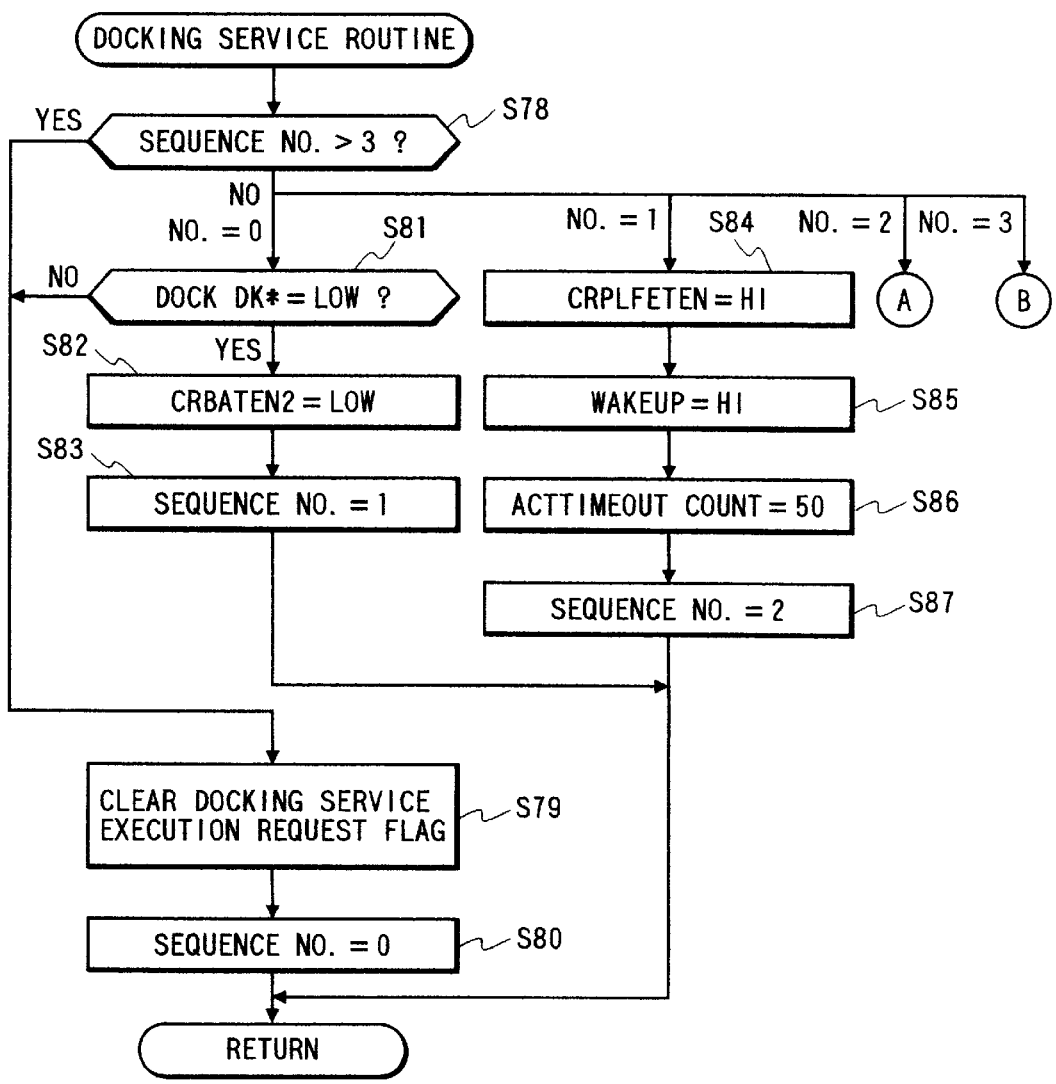
FIGS. 19 and 20 are flow charts showing the control sequence of a docking service routine.
Figure 20:
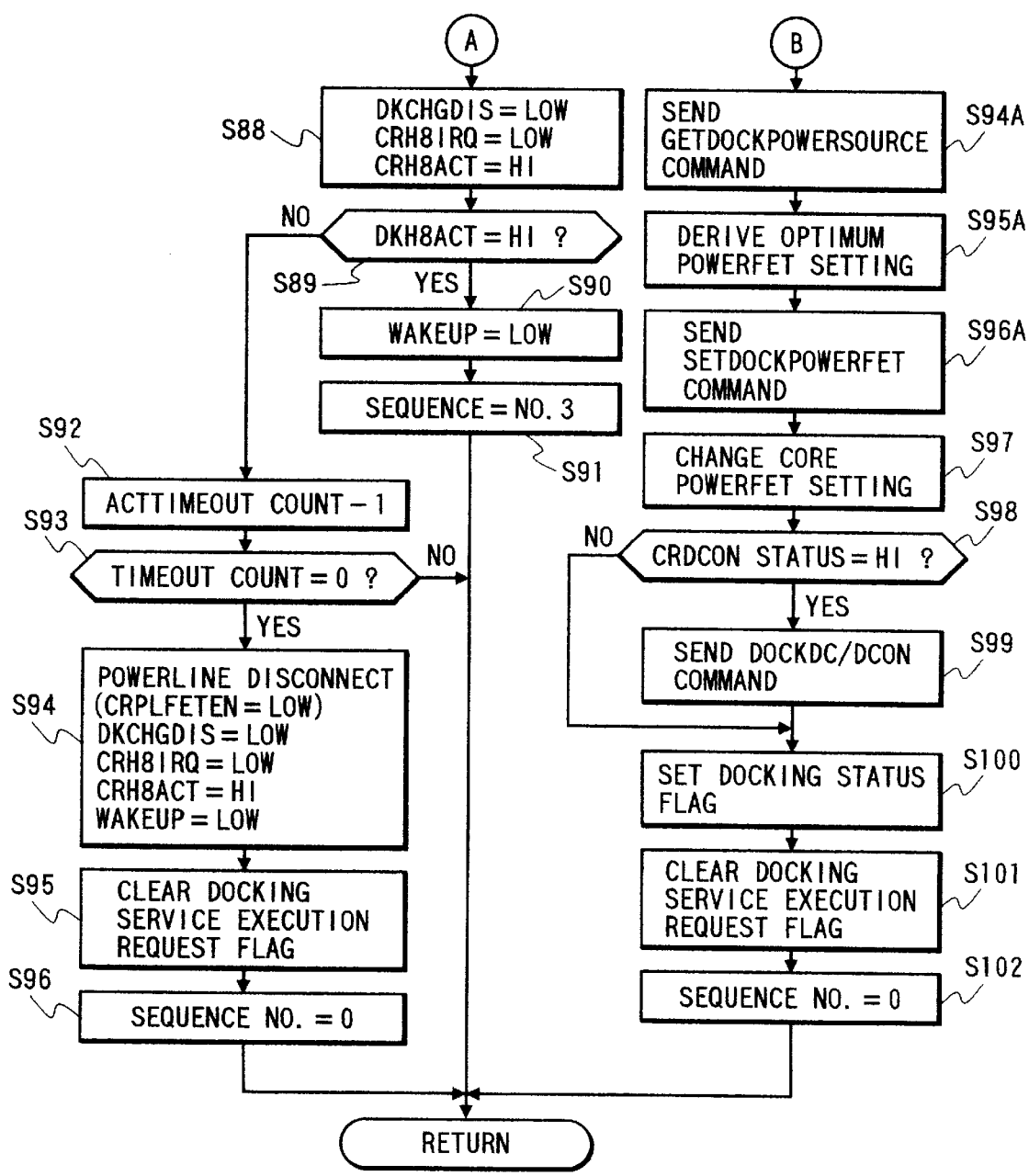
Figure 21A:
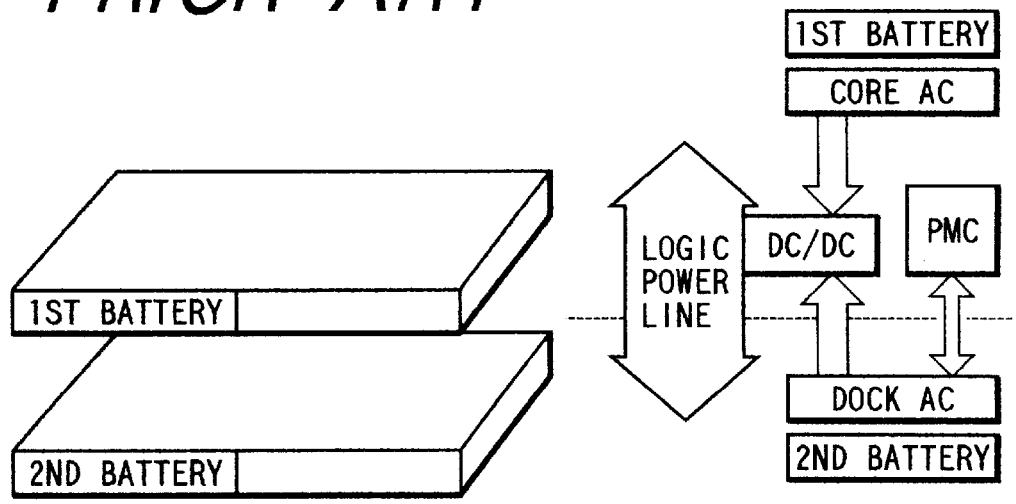
FIGS. 21A and 21B are views showing the power source configurations in conventional notebook personal computers.
Figure 21B:
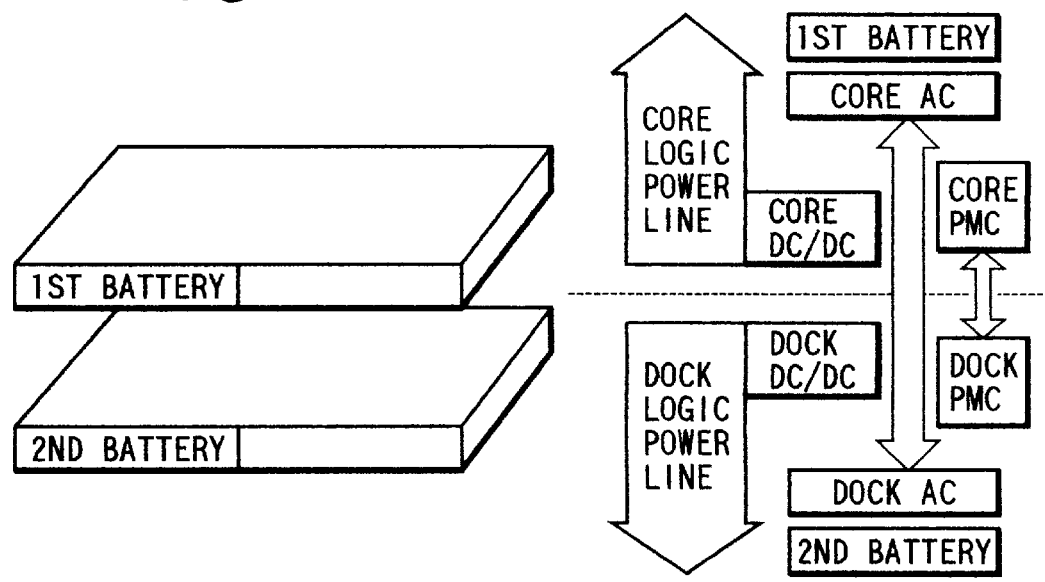

FIGS. 19 and 20 are flow charts showing the control sequence of the docking service routine, which consists of sequences of 4 levels, namely the tentative FET setting, the power line setting and activation of the one-chip microcomputer H8 of the other side, the output of an ACT signal and palling of the ACT signal of the other side, and the final process. These sequences are respectively defined as Nos. 0, 1, 2 and 3 and are stored in the work area of the internal RAM.

At first there is checked the sequence number (step S78), and, if the number is 4 or larger, the sequence branches to a step S79 to be explained later, whereby the present service routine is terminated.

If the sequence number is 0, indicating the first routine after the DOCK_DK* signal is rendered active, the DOCK_DK* signal is re-checked (step S81). If it is non-active, indicating an improper DOCK_DK* interruption for example by a noise or a chattering of the releasing lever 8, the docking service execution request flag and the sequence number are reset (steps S79, S80) and the docking service routine is terminated.

On the other hand, if the step S81 identifies that the DOCK_DK* signal is active, the CRBATEN2 signal is shifted to the low-level state in order to avoid current flowing from the battery 2 to the battery 1 through the power line (step S82), then the sequence number is shifted from 0 to 1 (step S83) and the docking service routine is terminated.

If the sequence number is 1, the CRPLFETEN signal is rendered active (Hi) (step S84) to initiate the power supply from the power source of the core unit to the docking unit. In this manner there is initiated the power supply to the DKH8DC/DC circuit, constituting the power source circuit for the Dock H8.

Also the WAKEUP signal is rendered active in order to initiate the power supply from the DKH8DC/DC circuit to the Dock H8 (step S85), then a count 50 (500 msec) is set, for a next sequence, in a counter ActTimeOut_Count for counting the waiting time for the ACT signal of the other side (step S86), then the sequence number is switched from 1 to 2 (step S87) and the docking service routine is terminated. The process of the sequence No. 1 is not particularly meaningful in case the docking unit has the power source, but does not detrimentally affect the docking sequence.

If the sequence number is 2, the ports that have been set for input by the output signal to the Dock H8 in the step S12 of the initialization process are switched to output (step S88). The DKCHGDIS and CRH8IRQ signals are set at the low output state while the CRH8ACT is set at the high output state.

Then there is checked the DCH8ACT signal, which is the ACT signal from the Dock H8 (step S89), and, if it is in the low-level state, the value of the ActTimeOut_Count is decreased by 1 (step S92), but, if it is not 0 (step S93), the docking service routine is terminated.

In case of value 0 (step S93), namely in case the ACT signal from the Dock H8 is not switched from the low-level state to the high-level state after the lapse of 500 msec from the activation of the Dock H8 by the WAKEUP signal, an error process is executed to disconnect the power line which has been connected in the step S84, to return the setting of the step S88 to that in the undocked state and to shift the WAKEUP signal to the low-level state (step S94).

Then the docking service execution request flag and the sequence number are reset (steps S95, S96) and the docking service routine is terminated.

In case the high-level state of the DKH8ACT signal is detected in the step S89 by within 50 checks of this signal, namely in case the activation or the docking of the Dock H8 is achieved in normal manner, the WAKEUP signal rendered active in the step S85 is switched to the non-active state (step S90), then the sequence number is shifted from 2 to 3 (step S91) and the docking service routine is terminated.

The process up to the sequence number 2 confirms that the Core H8 and the Dock H8 are on a substantially same sequence, namely that they have completed the initialization process and have moved to the main routine. Consequently the exchange of commands through the 12C bus is completely assured thereafter.

If the sequence number is 3, at first a command for acquiring the status of the power source of the docking unit is sent, through the 12C bus, to the Dock H8 (step S94A), and an optimum state of the power FET is calculated from the value returned from the Dock H8 and indicating the status of the power source of the docking unit side and the status of power source of the core unit obtained in the I/O service routine (step S95A).

This calculation is conducted by a table search, based on the presence or absence of the power source in the core unit and in the docking unit and on the remaining capacities of the batteries. The set value of the power FET of the docking unit, calculated by the table search, is informed by a command to the Dock H8 (step S96A), and the power FET of the core unit is switched from the state tentatively set in the step S82 to the setting calculated by the table search (step S97).

Then there is checked the status of the CRDCON signal which is the output signal to the system DC/DC circuit controlled in the I/O service routine (step S98), and, if the CRDCON signal is in the high-level state, a DockDCDCOn command for activating the system DC/DC circuit of the docking unit is transmitted to the Dock H8 through the 12C bus (step S99), then there is set a docking status flag for informing the completion of the docking service to other service routines (step S100), and the docking service execution request flag and the sequence number are reset (steps S101, S102) to complete the docking service routine. In this manner the docking service routine is completely terminated.

In the docking process of the system logic side, the Dock H8, in response to the DockDCDCOn command in the step S99, activates the system DC/DC circuit of the docking unit, also controls the DC motor for the releasing lever 8 so as to fix the same and supplies the core unit with a DOCK_PGS signal for executing the configuration of various logic devices of the docking unit in the BIOS SMI process.

As explained in the foregoing, the present invention enables coupling with the expander unit without detrimental effect on other functions, such as the keyboard control, supported by the power source control circuit of the electronic equipment.

What is claimed is:

1. An electronic equipment system, comprising:
    electronic equipment including a first power source and a first control part for controlling said first power source;
    an expander detachably attached to said electronic equipment, said expander including a second power source and a second control part for controlling said second power source,
    wherein the electronic equipment includes information transmission means for transmitting information between said first control part and said second control part;
    power transmission means for transmitting power between said electronic equipment and said expander,
    wherein power is transmitted or received through said transmission power means in accordance with the information.

2. An electronic equipment system according to claim 1, further comprising a first switching means and a second switching means for enabling or disabling said power transmission means, wherein said first control part controls said first switching means and said second control part controls said second switching means.

3. An electronic equipment system according to claim 1, wherein said electronic equipment further comprises a first judgement means for judging whether or not an AC adapter is connected thereto; and wherein said expander further comprises a second judgement means for judging whether or not an AC adapter is connected thereto.

4. An electronic equipment system according to claim 1, said electronic equipment further comprising connection judgement means for judging whether or not said expander is connected thereto.

5. An electronic equipment system according to claim 2, wherein said electronic equipment designates said expander to turn said second switching means on and said expander turns said second switching means on in accordance with said designation.

6. An electronic equipment system according to claim 4, wherein said connection judgement means detects whether said expander is attached to said electronic equipment.

7. An electronic equipment system according to claim 6, further comprising switching means for turning said power means on or off, wherein said electronic equipment transmits designation information to said expander when said connection judgement means detects that said expander is attached to said electronic equipment, and wherein said second control part turns said switching means on in accordance with the designation information.

8. An electronic equipment system according to claim 1, wherein said first control part controls operation modes of said electronic equipment and said expander.

9. A power transmitting method of an electronic equipment system including electronic equipment and an expander detachably attached to the electronic equipment, wherein the electronic equipment includes a first power source and a first control part for controlling the first power source, and wherein the expander includes a second power source and a second control part for controlling the second power source, said method comprising the steps of:

transmitting information between the first control part and the second control part; and transmitting power between the electronic equipment and the expander in accordance with the information.

10. A method according to claim 9, further comprising a first switching step and a second switching step for enabling or disabling power transmission, wherein the first switching step is performed by the first control part and the second switching step is performed by the second control part.

11. A method according to claim 9, further comprising the steps of:

a first judgment step for judging whether or not an AC adapter is connected to the electronic equipment; and second judgment step for judging whether or not an AC adapter is connected to the expander.

12. A method according to claim 9, further comprising a connection judgement step for judging whether or not the expander is connected to the electronic equipment.

13. A method according to claim 10, wherein the electronic equipment designates the expander to transmit power in the second switching step and the expander transmits power in the second switching step in accordance with said designation.

14. A method according to claim 12, wherein it is detected in the connection judgement step whether the expander is attached to the electronic equipment.

15. A method according to claim 14, further comprising a switching step for enabling or disabling power transmission in said power transmission step, wherein designation information is transmitted to the expander by the electronic equipment when it is detected that the expander is attached to the electronic equipment in said connection judgement step, and wherein the switching step is performed by the second control part in accordance with the designation information.

16. A method according to claim 9, further comprising a step of controlling operation modes of the electronic equipment and the expander by the first control part.

\* \* \* \* \*

UNITED STATES PATENT AND TRADEMARK OFFICE
CERTIFICATE OF CORRECTION

PATENT NO. : 6,209,105 B1
DATED : March 27, 2001
INVENTOR(S) : Akihiko Hamamoto

It is certified that error appears in the above-identified patent and that said Letters Patent is hereby corrected as shown below:

Column 1,
Line 40, "Also" should read -- Also, --.
Line 43, "Also" should read -- Also, --.
Line 51, "Also" should read -- Also, --.
Line 59, "Also" should read -- Also, --.

Column 4,
Line 36, "its" should be deleted.

Column 5,
Line 20, "Also" should read -- Also, --.
Line 31, "Also" should read -- Also, --.

Column 6,
Line 18, "Also" should read -- Also, --.

Column 9,
Line 18, "Also" should read -- Also, --.

Column 10,
Line 25, "is" should read -- is to --.

Column 11,
Line 17, "Finally" should read -- Finally, --.

Column 14,
Line 11, Subsequently" should read -- Subsequently, --.
Line 55, "Also" should read -- Also, --.

UNITED STATES PATENT AND TRADEMARK OFFICE
CERTIFICATE OF CORRECTION

PATENT NO. : 6,209,105 B1
DATED : March 27, 2001
INVENTOR(S) : Akihiko Hamamoto

It is certified that error appears in the above-identified patent and that said Letters Patent is hereby corrected as shown below:

Column 15,
Line 31, "Consequently" should read -- Consequently, --.

Signed and Sealed this

Twenty-ninth Day of January, 2002

Attest:

*Attesting Officer*

JAMES E. ROGAN
*Director of the United States Patent and Trademark Office*